US010665266B2

(12) United States Patent
Rabbat et al.

(10) Patent No.: US 10,665,266 B2
(45) Date of Patent: May 26, 2020

(54) INTEGRATING A PRERECORDED VIDEO FILE INTO A VIDEO

(71) Applicant: Gfycat, Inc., Palo Alto, CA (US)

(72) Inventors: Richard Rabbat, Palo Alto, CA (US);
Ernestine Fu, Northridge, CA (US);
Kasey Wang, Palo Alto, CA (US)

(73) Assignee: Gfycat, Inc., Palo Alto, CA (US)

( * ) Notice: Subject to any disclaimer, the term of this patent is extended or adjusted under 35 U.S.C. 154(b) by 0 days.

(21) Appl. No.: 15/934,818

(22) Filed: Mar. 23, 2018

(65) Prior Publication Data

US 2019/0295598 A1 Sep. 26, 2019

(51) Int. Cl.
*G06T 17/20* (2006.01)
*G11B 27/036* (2006.01)
*G06T 19/20* (2011.01)

(52) U.S. Cl.
CPC ............ *G11B 27/036* (2013.01); *G06T 17/20* (2013.01); *G06T 19/20* (2013.01)

(58) Field of Classification Search
CPC ........ G11B 27/036; G06T 17/20; G06T 19/20
See application file for complete search history.

(56) References Cited

U.S. PATENT DOCUMENTS

| 2008/0172293 A1* | 7/2008 | Raskin | G06Q 10/04 705/14.1 |
| 2012/0033032 A1* | 2/2012 | Kankainen | G01C 21/3647 348/36 |
| 2014/0059590 A1* | 2/2014 | Okubo | H04N 21/4316 725/32 |
| 2014/0087877 A1* | 3/2014 | Krishnan | A63F 13/65 463/33 |
| 2015/0178991 A1* | 6/2015 | Letzelter | G06F 3/0482 345/419 |
| 2017/0019633 A1* | 1/2017 | Shaburov | H04N 7/157 |

* cited by examiner

*Primary Examiner* — Eileen M Adams

(57) ABSTRACT

In a device and method for integrating a prerecorded video file into a video, a video of a scene is displayed on a display device of a mobile electronic device. A prerecorded video file to render on the display device is received. A modified prerecorded video file is generated by modifying a visual appearance of the prerecorded video file, where the modifying is for integrating the modified prerecorded video file into the scene. The modified prerecorded video file is superimposed over the video, such that the video is partially obscured by the modified prerecorded video file. The modified prerecorded video file is played while displaying the video, such that the modified prerecorded video file and a non-obscured portion of the video are rendered simultaneously.

16 Claims, 31 Drawing Sheets

1300
| SUPERIMPOSE THE PRERECORDED VIDEO FILE ONTO A REGION OF THE GRAPHICAL OBJECT 1310 |
FIG. 13A
1320
| RECEIVE A MESH THAT CONFORMS TO A REGION OF THE GRAPHICAL OBJECT 1330 |
| APPLY THE MESH TO THE PRERECORDED VIDEO FILE 1340 |
| SUPERIMPOSE THE PRERECORDED VIDEO FILE ONTO A REGION OF THE GRAPHICAL OBJECT AS A TEXTURE BASED ON THE MESH 1350 |
FIG. 13B
1360
| APPLY THE GRAPHICAL MODIFICATION TO THE PRERECORDED VIDEO FILE 1370 |
FIG. 13C

INTEGRATING A PRERECORDED VIDEO FILE INTO A VIDEO

BACKGROUND

Mobile electronic devices, such as those configured to be handheld or otherwise associated with a user, are employed in a wide variety of applications and environments. The ubiquity of devices such as mobile phones, smart phones, and other similar devices indicates the popularity and desire for these types of devices. Mobile electronic devices are increasingly used to interact with the physical environment.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 13A through 13C illustrate flow diagrams of example methods for generating a modified prerecorded video file, according to various embodiments.

DESCRIPTION OF EMBODIMENTS

Figure 1:
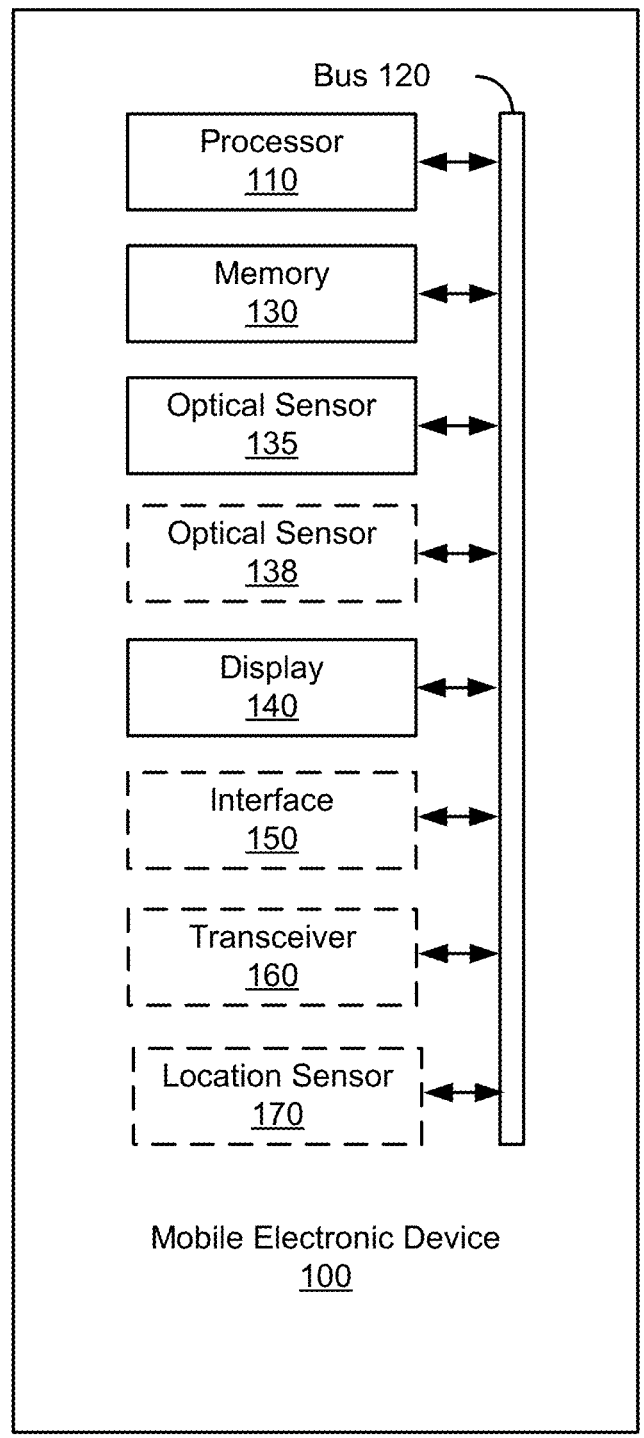
FIG. 1 is a block diagram of an example mobile electronic device, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying," "receiving," "superimposing," "playing," "capturing," "determining," "using," "placing," "selecting," "initiating," "logging," or the like, refer to the actions and processes of an electronic device such as: a processor, a processor, an optical sensor, a sensor, a memory, a mobile electronic device, a sensor processing unit, a sensor processor, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Examples of superimposing a prerecorded media file into a video are then described. Examples of selection of a prerecorded media file for superimposing into a video are then described. Example operations of superimposing a prerecorded media file into a video and selection of a prerecorded media file for superimposing into a video are then described. Examples of tracking interactivity with a prerecorded media file superimposed into a video are then described.

In accordance with various embodiments, methods for superimposing a prerecorded media file into a video are provided. A video of a scene is displayed on a display device of a mobile electronic device. A prerecorded video file to render on the display device is received. The prerecorded video file is superimposed over the video, such that the video is partially obscured by the prerecorded video file. The prerecorded video file is played while displaying the video, such that the prerecorded video file and a non-obscured portion of the video are rendered simultaneously. In some embodiments, live video is captured at a video capture device of the mobile electronic device, such that the video displayed on the display device is the live video.

Mobile electronic devices, in accordance with some described embodiments, include cameras and display screens (e.g., displays or display devices). These mobile electronic devices are capable for showing a user a live video of a scene the user is looking at (e.g., directing the camera towards). Embodiments described herein provide for the superimposing of prerecorded video files over the live video, such that the prerecorded video file displays content over the live video. This content can be related to an object within the scene (e.g., a particular location, an identified symbol or logo, an identified word or phrase, etc.) In some embodiments, the superimposed prerecorded video content can appear as if it is part of the geography of the scene, integrating directly into the scene.

Embodiments described herein pertain to superimposing a prerecorded media file into a video. In one embodiment, the prerecorded media file is a Graphics Interchange Format (GIF) file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat.

In some embodiments, the prerecorded video file is selectable for interactivity. For example, a user may interact with a prerecorded video file (e.g., touching it via a touch screen) to execute an action. For example, a user interaction with a prerecorded video file may open up an Internet browser application and navigate to a particular website. In other examples, a user interaction with a prerecorded video file may show content (e.g., a coupon or product information). In some embodiments, the prerecorded video file may be transformed as a result of a user interaction (e.g., the prerecorded video file can be resized or moved within a display).

In some embodiments, depth information of the scene captured within the video is determined. The depth information defines distances of points of the scene from a video capture device, such that the depth information comprises relative depths of the points of the scene based on a position of the video capture device.

In one embodiment, the prerecorded video file is placed over the video at a particular distance from the position of the video capture device based on the depth information. In another embodiment, the prerecorded video file is placed over the video at the distances that the points of the scene are from the video capture device based on the depth information, such that the prerecorded video file is visually integrated into the scene. In one embodiment, the depth information includes surface contours of objects within the scene, such that the prerecorded video file is placed over the video following the surface contours of the objects. In another embodiment, a flat region of the scene within the video is identified based on the depth information. The prerecorded video file is placed over the video at the flat region of the scene, such that the prerecorded video file is visually integrated into the scene at the flat region.

In accordance with some embodiments, methods for selecting of a prerecorded media file for superimposing into a video are provided. A video of a scene is displayed on a display device of a mobile electronic device. A location of the scene is determined. A prerecorded video file is selected based at least in part on the location. The prerecorded video file is superimposed over the video, such that the video is partially obscured by the prerecorded video file. In one embodiment, the prerecorded video file is an advertisement related to the location. In another embodiment, the prerecorded video file is a user-generated video file selected from a library of media files. The prerecorded video file is played while displaying the video, such that the prerecorded video file and a non-obscured portion of the video are rendered simultaneously. In some embodiments, live video is captured at a video capture device of the mobile electronic device, such that the video displayed on the display device is the live video.

The selection of a prerecorded video file to superimpose over a scene may be based on a location of the scene. For example, where the scene is a physical place of business (e.g., a restaurant or a clothing store), a prerecorded video file related to that physical place may be superimposed over the video of the scene, to enhance the user's experience of viewing the scene. For instance, the prerecorded video file may be an advertisement for the place of business, a coupon for use upon purchasing an item from the business, or any other information chosen by the proprietor of the business (e.g., information on the benefits of a product sold by the business.

In another example, the prerecorded video file that is selected for superimposing is user-generated content. For example, a user of the mobile electronic device can subscribe to prerecorded video file feeds or can be linked to prerecorded video files via a social network friend connection. Upon identifying a location, a prerecorded video file can be superimposed over the scene to enhance the appearance of the scene. For example, a prerecorded video file can appear to decorate or adorn a structure in a neighborhood (e.g., a wall, a billboard, a skyline, etc.). In another example, a prerecorded video file may be superimposed over or around an identified symbol.

In one embodiment, the location of the scene is determined using a navigation satellite system sensor (e.g., Global Positioning System (GPS) sensor) of the mobile electronic device. In another embodiment, the location of the scene is determined using a third party application (e.g., Foursquare, Yelp). In another embodiment, symbol recognition is performed on the video to identify at least one symbol (e.g., logo, word, phrase, etc.) A location database is searched for the symbol to determine the location. In some embodiment, the prerecorded video file is placed over the video without obscuring the at least one symbol.

Embodiments described herein provide methods for superimposing a prerecorded media file into a video and selection of a prerecorded media file for superimposing into a video. The described embodiments provide visual enhancements to scenes within the video, providing a richer and deeper user experience. By superimposing a prerecorded video file over a live video, the scene captured by the live video is made fuller, providing enriched user interaction with their surroundings, promoting interaction with the object of a scene (e.g., item for purchase, place of business, etc.) beyond the confines of the real-world view of the location captured by the scene.

Example Mobile Electronic Device

Turning now to the figures, FIG. 1 is a block diagram of an example mobile electronic device 100. As will be appreciated, mobile electronic device 100 may be implemented as a device or apparatus, such as a handheld mobile electronic device, that can be moved in space by a human user. That is, mobile electronic device 100 is small enough to be held in the hand of a human user, in various embodiments. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, a headset, or a combination of one or more of these devices.

As depicted in FIG. 1, mobile electronic device 100 may include a processor 110, a bus 120, a memory 130, at least one optical sensor 135, and a display 140. Some embodiments of mobile electronic device 100 may further include one or more of an interface 150, a transceiver 160 (all depicted in dashed lines), a location sensor 170, and/or other components. In various embodiments, electrical power for mobile electronic device 100 is provided by a mobile power source such as a battery, when not being actively charged.

Processor 110 can be one or more microprocessors, central processing units (CPUs), DSPs, general purpose microprocessors, ASICs, ASIPs, FPGAs or other processors which run software programs or applications, which may be stored in memory 130, associated with the functions and capabilities of mobile electronic device 100.

Bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, processor 110, memory 130, display 140, interface 150, transceiver 160, and other components of mobile electronic device 100 may be coupled communicatively through bus 120 in order to exchange commands and data. Depending on the architecture, different bus configurations may be employed as desired. For example, additional buses may be used to couple the various components of mobile electronic device 100, such as by using a dedicated bus between processor 110 and memory 130.

Memory 130 can be any suitable type of memory, including but not limited to electronic memory (e.g., read only memory (ROM), random access memory, or other electronic memory), hard disk, optical disk, or some combination thereof. Multiple layers of software can be stored in memory 130 for use with/operation upon processor 110. For example, an operating system layer can be provided for mobile electronic device 100 to control and manage system resources in real time, enable functions of application software and other layers, and interface application programs with other software and functions of mobile electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 100, and in some of those embodiments, multiple applications can run simultaneously as part of the user experience system. In some embodiments, the user experience system, operating system, and/or the processor 110 may operate in a low-power mode (e.g., a sleep mode) where very few instructions are processed. Such a low-power mode may utilize only a small fraction of the processing power of a full-power mode (e.g., an awake mode) of the processor 110.

Optical sensor 135 may comprise, without limitation: a video capture device, a camera, and infrared camera, or other type of optical sensor for capturing a video of a person, an object, and/or a scene. It should be appreciated that mobile electronic device 100 may include more than one optical sensor. In one example, optical sensor 135 is a back-side optical sensor (e.g., rear-facing camera) and optical sensor 138 is a front-side optical sensor (e.g., front-facing camera).

Display 140, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. Display 140 is configured to display video captured at optical sensor 135 (and optical sensor 138, when included).

Interface 150, when included, can be any of a variety of different devices providing input and/or output to a user, such as audio speakers, touch screen integrated with display 140, real or virtual buttons, joystick, slider, knob, printer, scanner, computer network I/O device, other connected peripherals and the like.

Transceiver 160, when included, may be one or more of a wired or wireless transceiver which facilitates receipt of data at mobile electronic device 100 from an external transmission source and transmission of data from mobile electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Location sensor 170, when included, may be a sensor for determining a location of mobile electronic device 100, such as a navigation satellite system sensor such as a Global Navigation Satellite System (GNSS) receiver (e.g., Global Positioning System (GPS) sensor) a and/or other component configured to determine the location of mobile electronic device 100 from external radio signals. It is noted that the functionality of location sensor 170 may be implemented by processor 110.

Figure 2:
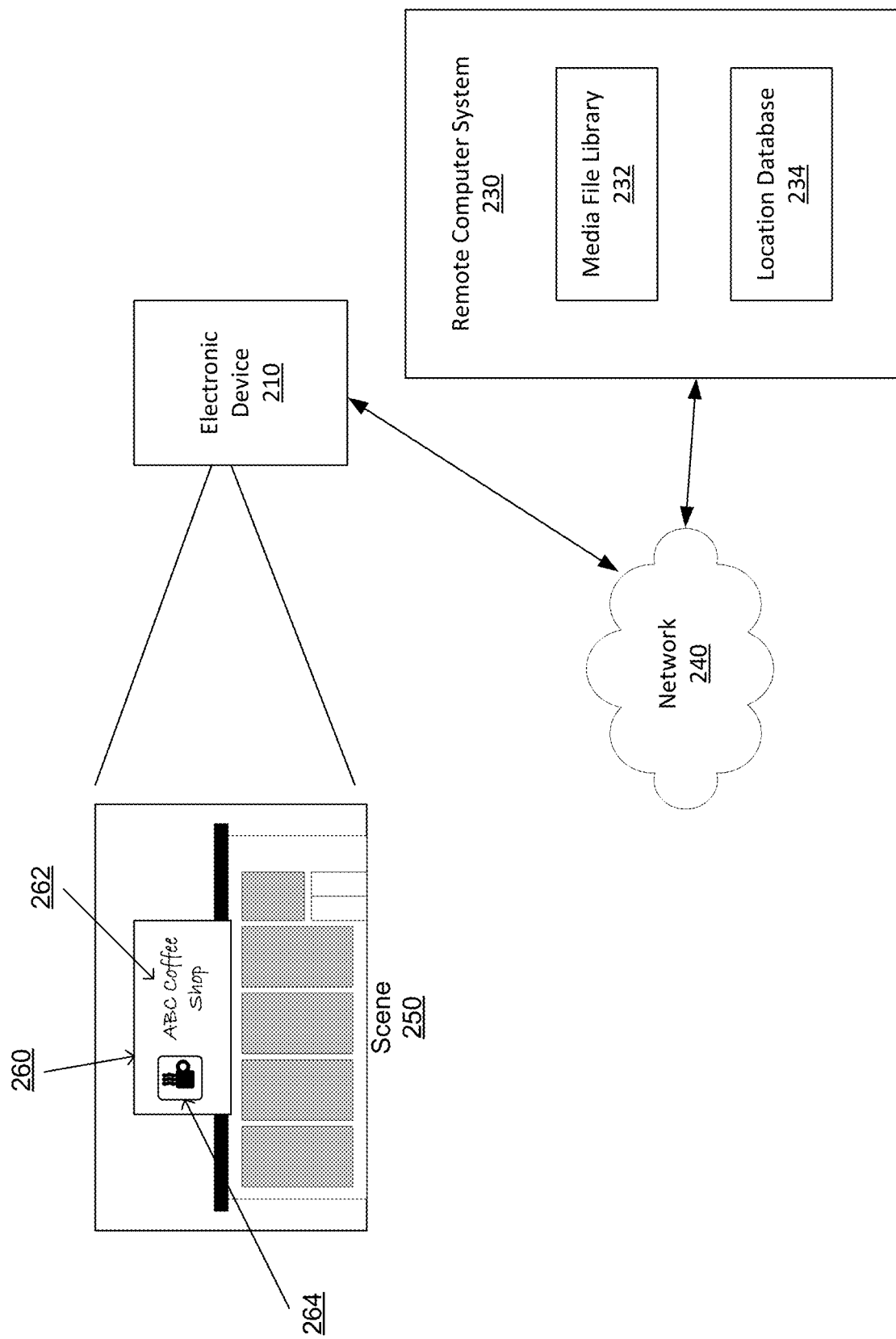
FIG. 2 illustrates an example network upon which embodiments described herein may be implemented.

Example Network and System for Superimposing Prerecorded Video Files into a Video FIG. 2 illustrates an example communication network 240 upon which embodiments described herein may be implemented. FIG. 2 illustrates electronic device 210 and remote computer system 230 which are communicatively coupled via network 240. It should be appreciated that electronic device 210 may be implemented as a mobile electronic device 100, and/or include any combination of the components of mobile electronic device 100.

Electronic device 210 is capable of displaying video of scene 250 (e.g., at display 140). In one embodiment, scene 250 is captured at a video capture device (e.g., optical sensor 135-1) of electronic device 210. Electronic device 210 may be associated with a particular user.

In one embodiment, remote computer system 230 is a server including a media file library 232. A media file can be any type of file that can be rendered on an electronic device 210 (e.g., a prerecorded video file). It should be appreciated that any type of media file format can be used in accordance with the described embodiments, including but not limited to Graphics Interchange Format (GIF), WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat.

In some embodiments, electronic device 210 is capable of accessing media file library 232 for retrieving a prerecorded media file. It should be appreciated that electronic device 210 may include media file library 232, or that media file library 232 may be distributed across both electronic device 210 and remote computer system 230. For example, a subset of media files of media file library 232 may be maintained within memory of electronic device 210 (e.g., frequently used media files) for access that does not require communication over network 240.

In some embodiments, a prerecorded video file for superimposing over a video is selected based at least in part on the location of the scene. For example, where scene 250 is a physical place of business (e.g., a coffee shop), a prerecorded video file related to that business may be superimposed over the video of the scene, to enhance the user's experience of viewing the scene. For instance, the prerecorded video file may be an advertisement for the place of business, a coupon for use upon purchasing an item from the business, or any other information chosen by the proprietor of the business (e.g., information on the benefits of a product sold by the business).

In some embodiments, the prerecorded video file is selectable for interactivity. For example, a user may interact with a prerecorded video file (e.g., touching it via a touch screen) to execute an action. For example, a user interaction with a prerecorded video file may open up an Internet browser application and navigate to a particular website. In other examples, a user interaction with a prerecorded video file may show content (e.g., a coupon or product information). In some embodiments, the prerecorded video file may be transformed as a result of a user interaction (e.g., the prerecorded video file can be resized or moved within a display).

In one embodiment, the location of the scene is determined using a location sensor (e.g., location sensor 170) of the mobile electronic device. In another embodiment, the location of the scene is determined using a third party application (e.g., Foursquare, Yelp). In another embodiment, symbol recognition is performed on the video to identify at least one symbol (e.g., logo, word, phrase, etc.) With reference to FIG. 2, scene 250 depicts an exterior of a business including a sign 260. Sign 260 may include a text name 262 (e.g., ABC Coffee Shop) and/or a logo 264. In one embodiment, symbol recognition is performed on text name 262 and/or a logo 264. A location database 234 of locations associated with identified symbols is searched for the symbol to determine the location. It should be appreciated that the location may refer to a name and/or type of business rather than a specific instance of a business (e.g., the location is a Starbucks coffee shop, rather than one specific Starbucks).

Embodiments described herein provide a prerecorded video file superimposed over a video, wherein the prerecorded video file and non-obscured portion of the video are rendered simultaneously. FIGS. 3A through 3E illustrate examples of a prerecorded video file superimposed over a video, in accordance with various embodiments.

Figure 3A:
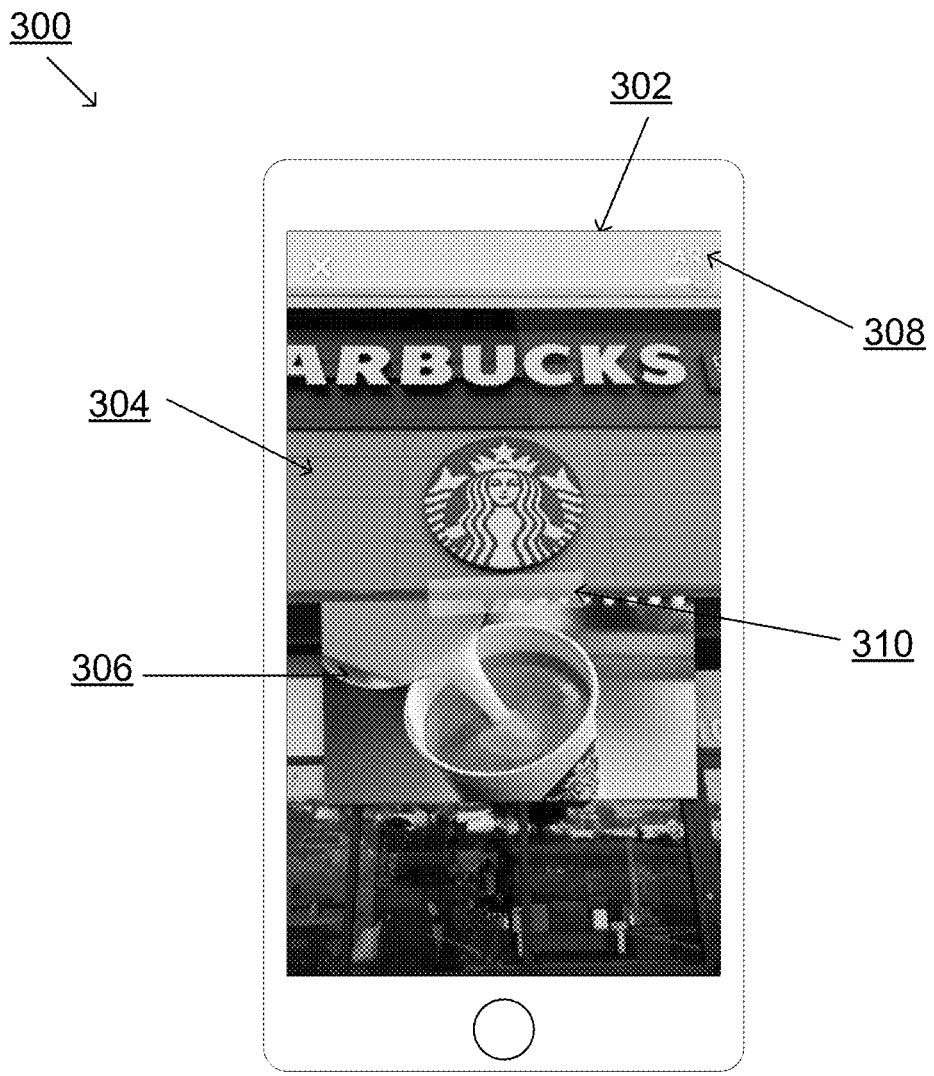
FIGS. 3A through 3E illustrate examples of a prerecorded video file superimposed over a video, in accordance with various embodiments.

FIG. 3A illustrates an example mobile electronic device 300 having a display 302. As illustrated, display 302 is displaying video 304, where video 304 depicts a scene of a business location (e.g., a Starbucks coffee shop). In one embodiment, video 304 is a live video captured by a video capture device (e.g., a rear-facing camera) of mobile electronic device 300. It should be appreciated that in accordance with other embodiments, video 304 may be captured at another mobile electronic device, and transmitted to mobile electronic device 300 for rendering on display 302, either in real-time (e.g., live) or time delayed.

In one embodiment, video 304 is rendered via a camera application of mobile electronic device 300. In another embodiment, video 304 is rendered via an application of mobile electronic device 300 for superimposing a prerecorded video file over video 304. It should be appreciated that the superimposing of a prerecorded video file over a video may be performed at a standalone application of mobile electronic device 300 or via a plugin/modification of an existing application of mobile electronic device 300. In one embodiment, the superimposing of a prerecorded video file over video 304 is executed responsive to a user interaction with control element 308. Control element 308 is operable to activate/deactivate the superimposing of a prerecorded video file over video 304.

Mobile electronic device 300 also plays prerecorded video file 306 over video 304. Prerecorded video file 306, as illustrated, includes subject matter related to the business location illustrated in video 304. In some embodiments, prerecorded video file 306 is selected based on the location of the scene of video 304. For example, since video 304 is a video of a Starbucks coffee shop, prerecorded video file 306 depicts pouring and preparation of a cup of coffee, so as to entice the user of mobile electronic device 300 to visit the coffee shop. It should be appreciated that in some embodiments, prerecorded video file 306 is positioned within display 302 so as to not obscure important visual elements of video 304 (e.g., the name of the business location, the logo of the business location, etc.)

In one embodiment, static element 310 is also rendered on display 302. Static element 310 is an element for visually indicating that prerecorded video file 306 is virtually held in place in space. For example, as illustrated, static element 310 depicts a piece of tape, indicating that prerecorded video file 306 is virtually fixed in space via static element 310. Other examples of static element 310 include a picture frame, a staple, an easel, etc.

Figure 3B:
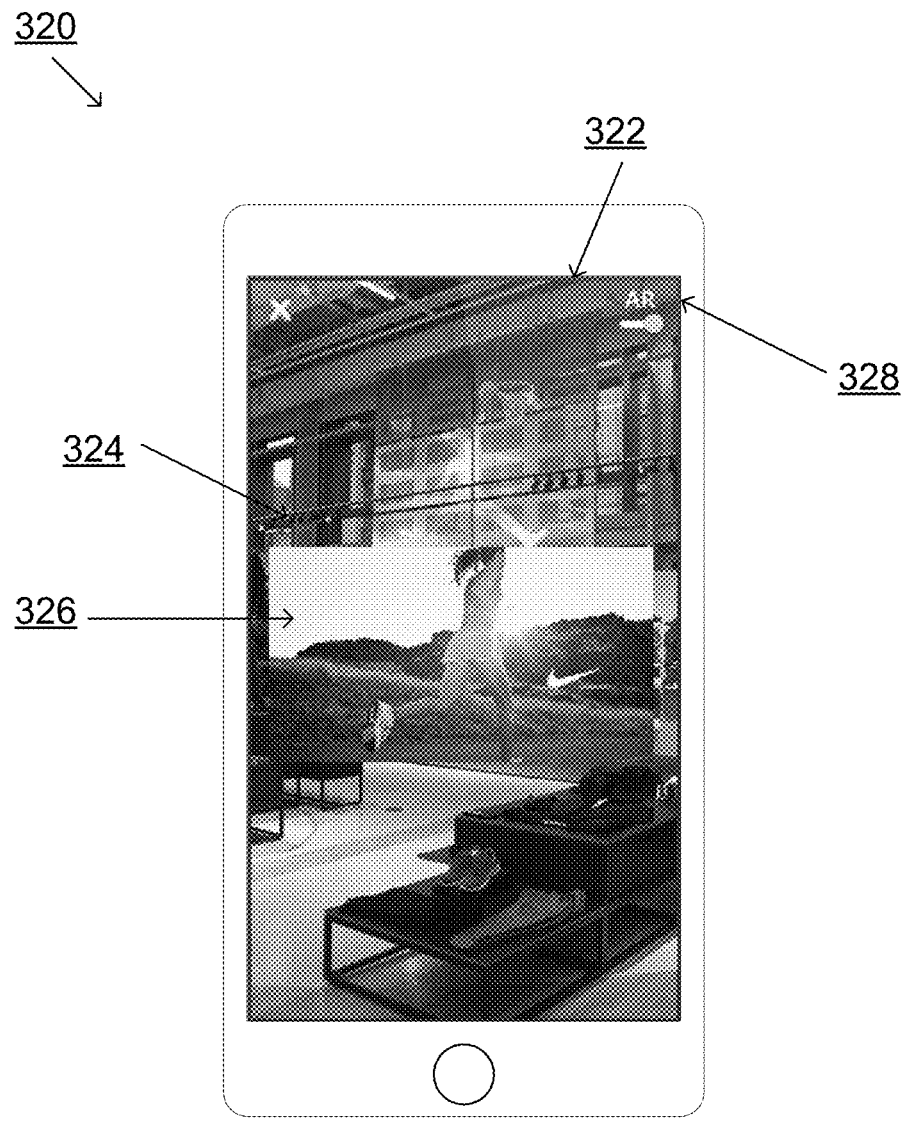

FIG. 3B illustrates an example mobile electronic device 320 having a display 322. As illustrated, display 322 is displaying video 324, where video 324 depicts a scene of a business location (e.g., an athletic clothing store). In one embodiment, video 324 is a live video captured by a video capture device (e.g., a rear-facing camera) of mobile electronic device 320. It should be appreciated that in accordance with other embodiments, video 324 may be captured at another mobile electronic device, and transmitted to mobile electronic device 320 for rendering on display 322, either in real-time (e.g., live) or time delayed.

In one embodiment, video 324 is rendered via a camera application of mobile electronic device 320. In another embodiment, video 324 is rendered via an application of mobile electronic device 320 for superimposing a prerecorded video file over video 324. It should be appreciated that the superimposing of a prerecorded video file over a video may be performed at a standalone application of mobile electronic device 320 or via a plugin/modification of an existing application of mobile electronic device 320. In one embodiment, the superimposing of a prerecorded video file over video 324 is executed responsive to a user interaction with control element 328. Control element 328 is operable to activate/deactivate the superimposing of a prerecorded video file over video 324.

Mobile electronic device 320 also plays prerecorded video file 326 over video 324. Prerecorded video file 326, as illustrated, includes subject matter related to the business location illustrated in video 324. In some embodiments, prerecorded video file 326 is selected based on the location of the scene of video 324. For example, since video 324 is a video of an athletic clothing store, prerecorded video file 326 depicts a person running using athletic clothing and shoes available for sale at the athletic clothing store, so as to entice the user of mobile electronic device 320 to purchase clothing and/or shoes. It should be appreciated that in some embodiments, prerecorded video file 326 is positioned within display 322 so as to not obscure important visual elements of video 324 (e.g., the name of the business location, the logo of the business location, the depicted clothing and/or shoes, etc.)

Figure 3C:
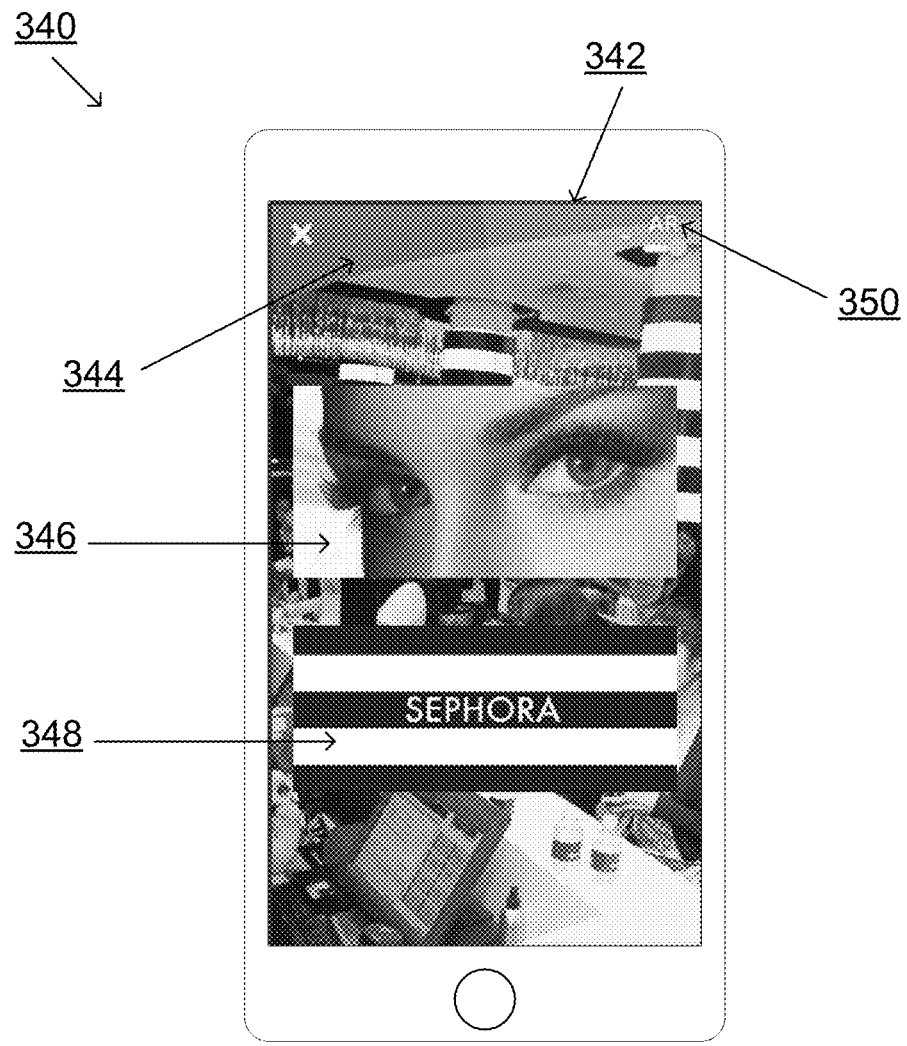

FIG. 3C illustrates an example mobile electronic device 340 having a display 342. As illustrated, display 342 is displaying video 344, where video 344 depicts a scene of a business location (e.g., a Sephora cosmetics shop). In one embodiment, video 344 is a live video captured by a video capture device (e.g., a rear-facing camera) of mobile electronic device 340. It should be appreciated that in accordance with other embodiments, video 344 may be captured at another mobile electronic device, and transmitted to mobile electronic device 340 for rendering on display 342, either in real-time (e.g., live) or time delayed.

In one embodiment, video 344 is rendered via a camera application of mobile electronic device 340. In another embodiment, video 344 is rendered via an application of mobile electronic device 340 for superimposing a prerecorded video file over video 344. It should be appreciated that the superimposing of a prerecorded video file over a video may be performed at a standalone application of mobile electronic device 340 or via a plugin/modification of an existing application of mobile electronic device 340. In one embodiment, the superimposing of a prerecorded video file over video 344 is executed responsive to a user interaction with control element 350. Control element 350 is operable to activate/deactivate the superimposing of a prerecorded video file over video 344.

Mobile electronic device 340 also plays prerecorded video files 346 and 348 over video 344. Prerecorded video files 346 and 348, as illustrated, include subject matter related to the business location illustrated in video 344. In some embodiments, prerecorded video files 346 and 348 are selected based on the location of the scene of video 344. For example, since video 344 is a video of a cosmetics shop, prerecorded video file 346 depicts cosmetics in user and prerecorded video file 348 illustrates a video of the logo/name of the cosmetics shop, so as to entice the user of mobile electronic device 340 to visit the coffee shop. It should be appreciated that in some embodiments, prerecorded video files 346 and 348 are positioned within display 342 so as to not obscure important visual elements of video 344 (e.g., the name of the business location, the logo of the business location, products available for purchase, etc.)

Figure 3D:
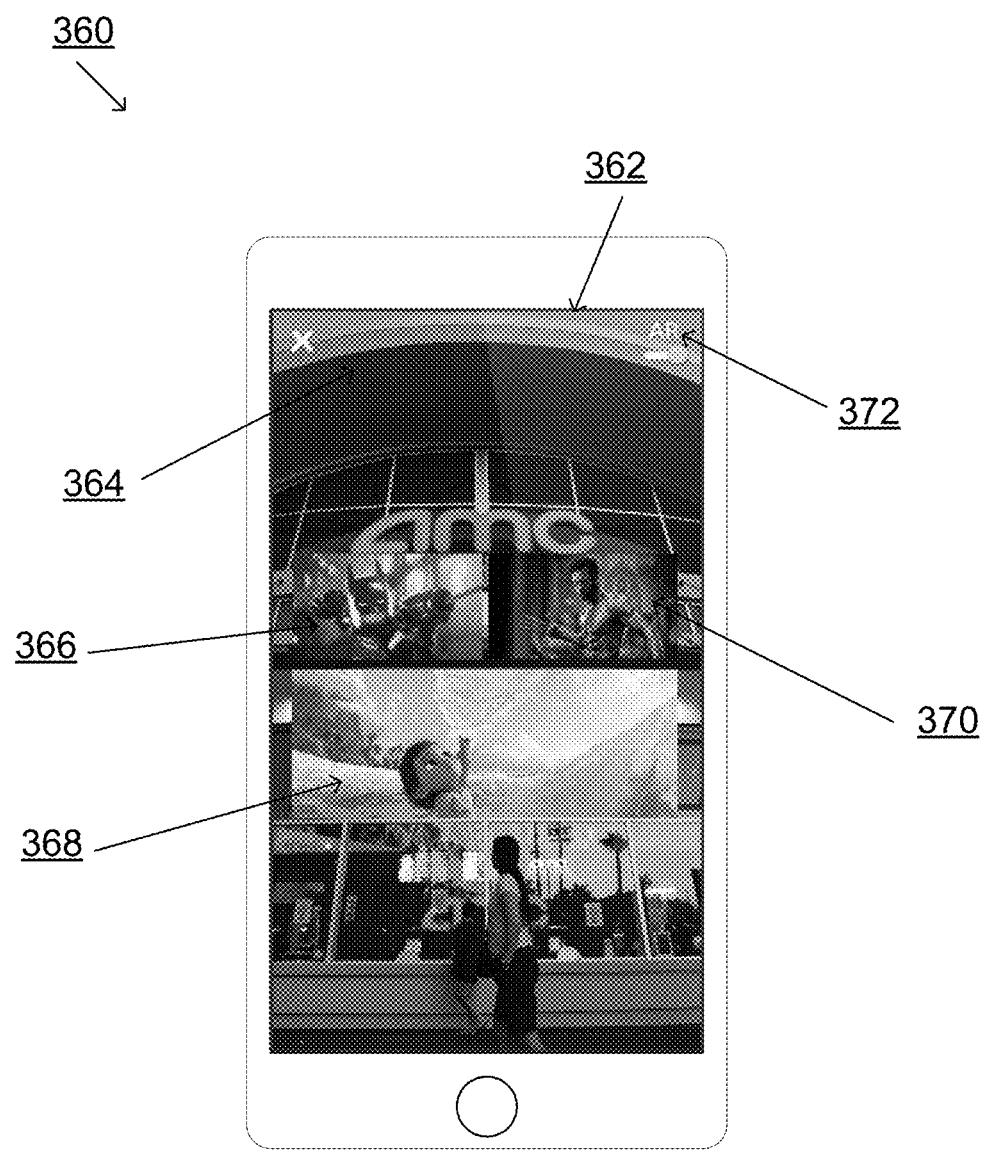

FIG. 3D illustrates an example mobile electronic device 360 having a display 362. As illustrated, display 362 is displaying video 364, where video 364 depicts a scene of a business location (e.g., a movie theater). In one embodiment, video 364 is a live video captured by a video capture device (e.g., a rear-facing camera) of mobile electronic device 360. It should be appreciated that in accordance with other embodiments, video 364 may be captured at another mobile electronic device, and transmitted to mobile electronic device 360 for rendering on display 362, either in real-time (e.g., live) or time delayed.

In one embodiment, video 364 is rendered via a camera application of mobile electronic device 360. In another embodiment, video 364 is rendered via an application of mobile electronic device 360 for superimposing a prerecorded video file over video 364. It should be appreciated that the superimposing of a prerecorded video file over a video may be performed at a standalone application of mobile electronic device 360 or via a plugin/modification of an existing application of mobile electronic device 360. In one embodiment, the superimposing of a prerecorded video file over video 364 is executed responsive to a user interaction with control element 372. Control element 372 is operable to activate/deactivate the superimposing of a prerecorded video file over video 364.

Mobile electronic device 360 also plays prerecorded video files 366, 368, and 370 over video 364. Prerecorded video files 366, 368, and 370 as illustrated, include subject matter related to the business location illustrated in video 364. In some embodiments, prerecorded video files 366, 368, and 370 are selected based on the location of the scene of video 364. For example, since video 364 is a video of a cosmetics shop, prerecorded video files 366, 368, and 370 illustrate videos of movie previews for movies currently showing at the movie theater, so as to entice the user of mobile electronic device 360 to see a movie at the movie theater and to guide the user in the selection of a particular movie. It should be appreciated that in some embodiments, prerecorded video files 366, 368, and 370 are positioned within display 362 so as to not obscure important visual elements of video 364 (e.g., the name of the business location, the logo of the business location, etc.)

Figure 3E:
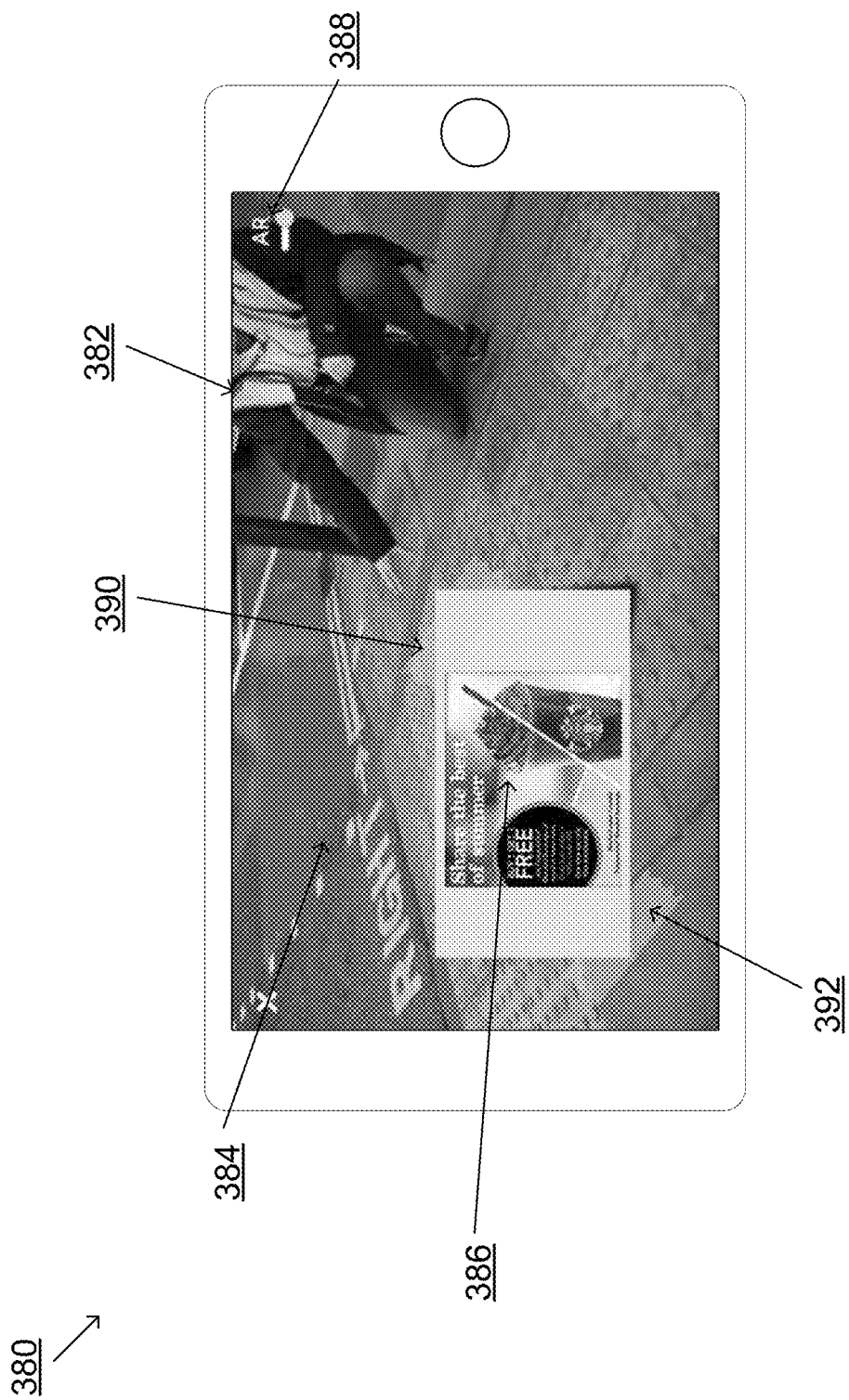

FIG. 3E illustrates an example mobile electronic device 380 having a display 382. As illustrated, display 382 is displaying video 384, where video 384 depicts a scene of a sidewalk (e.g., a sidewalk near or in front of a business). In one embodiment, video 384 is a live video captured by a video capture device (e.g., a rear-facing camera) of mobile electronic device 380. It should be appreciated that in accordance with other embodiments, video 384 may be captured at another mobile electronic device, and transmitted to mobile electronic device 380 for rendering on display 382, either in real-time (e.g., live) or time delayed.

In one embodiment, video 384 is rendered via a camera application of mobile electronic device 380. In another embodiment, video 384 is rendered via an application of mobile electronic device 380 for superimposing a prerecorded video file over video 384. It should be appreciated that the superimposing of a prerecorded video file over a video may be performed at a standalone application of mobile electronic device 380 or via a plugin/modification of an existing application of mobile electronic device 380. In one embodiment, the superimposing of a prerecorded video file over video 384 is executed responsive to a user interaction with control element 388. Control element 388 is operable to activate/deactivate the superimposing of a prerecorded video file over video 384.

Mobile electronic device 380 also plays prerecorded video file 386 over video 384. Prerecorded video file 386, as illustrated, includes subject matter related to a business near the location of the sidewalk illustrated in video 384. In some embodiments, prerecorded video file 386 is selected based on the location of the scene of video 384. For example, video 384 is a video of a sidewalk near or in front of a Starbucks coffee shop. Prerecorded video file 386 depicts a video of a beverage available for purchase at the Starbucks coffee shop and a coupon for that beverage, so as to entice the user of mobile electronic device 380 to visit the coffee shop. It should be appreciated that in some embodiments, prerecorded video file 386 is positioned within display 382 so as to not obscure important visual elements of video 384 (e.g., the name of the business location, the logo of the business location, traffic signs, etc.)

In one embodiment, static elements 390 and 392 are also rendered on display 382. Static elements 390 and 392 are element for visually indicating that prerecorded video file 386 is virtually held in place in space. For example, as illustrated, static elements 390 and 392 depict pieces of tape, indicating that prerecorded video file 386 is virtually fixed in space via static elements 390 and 392. Other examples of static elements 390 and 392 include a picture frame, a staple, an easel, etc.

In some embodiments, depth information of the scene captured within the videos is determined. The depth information defines distances of points of the scene from a video capture device, such that the depth information comprises relative depths of the points of the scene based on a position of the video capture device. In accordance with various embodiments, the depth information can be determined via the image capture device (e.g., a camera such as an infrared camera), or via a software development kit (SDK), such as Google's ARCore or Apple's ARKit.

In various embodiments, the prerecorded video file is placed over the video at a particular distance from the position of the video capture device based on the depth information. For example, as illustrated in FIGS. 3A through 3E, the prerecorded video files are positioned within the display so as to appear at some distance from the user (e.g., two feet) and between the objects of the scene and the user. In such embodiments, the prerecorded videos may appear to float within the scene between objects of the scene and the user.

In another embodiment, the prerecorded video file is placed over the video at the distances that the points of the scene are from the video capture device based on the depth information, such that the prerecorded video file is visually integrated into the scene. In one embodiment, the depth information includes surface contours of objects within the scene, such that the prerecorded video file is placed over the video following the surface contours of the objects. In another embodiment, a flat region of the scene within the video is identified based on the depth information. The prerecorded video file is placed over the video at the flat region of the scene, such that the prerecorded video file is visually integrated into the scene at the flat region.

Figure 4A:
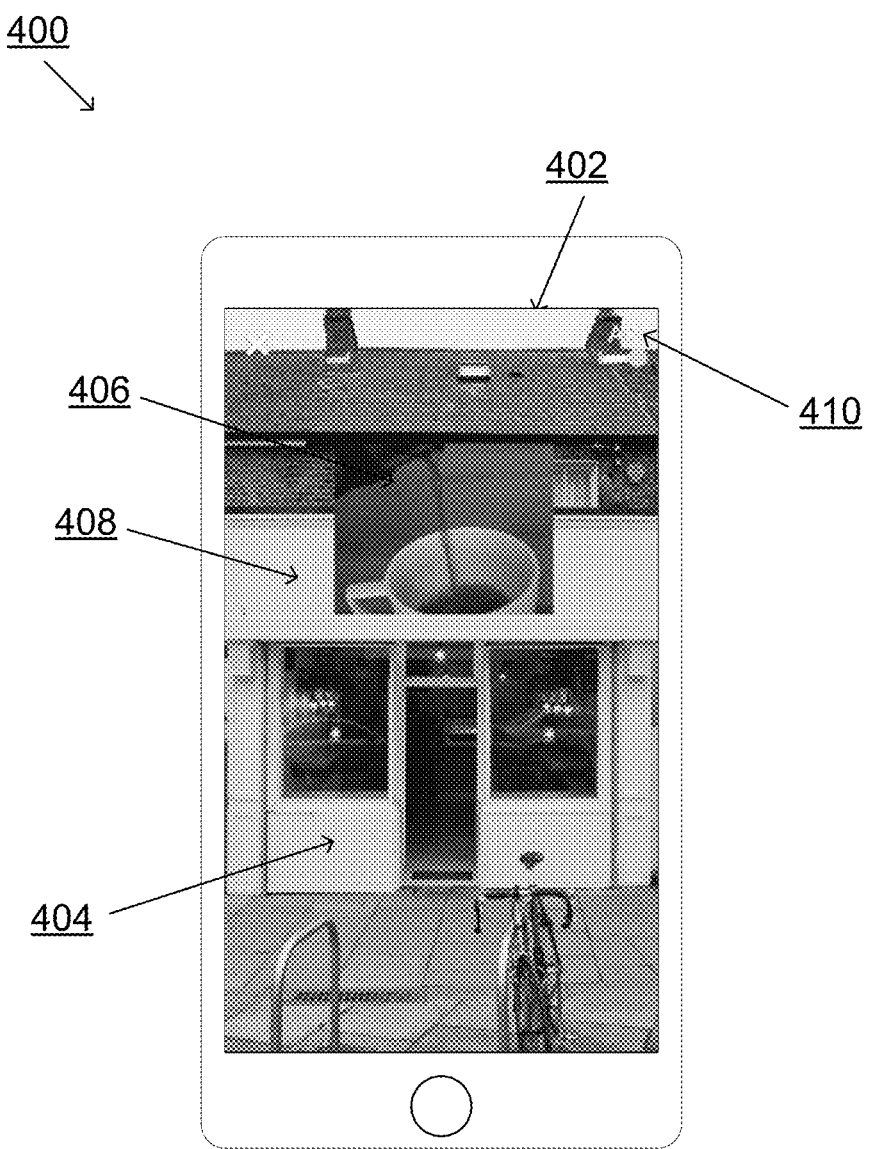
FIGS. 4A through 4C illustrate examples of a prerecorded video file superimposed over a video positioned relative to an object within the video, in accordance with various embodiments.
Figure 4B:
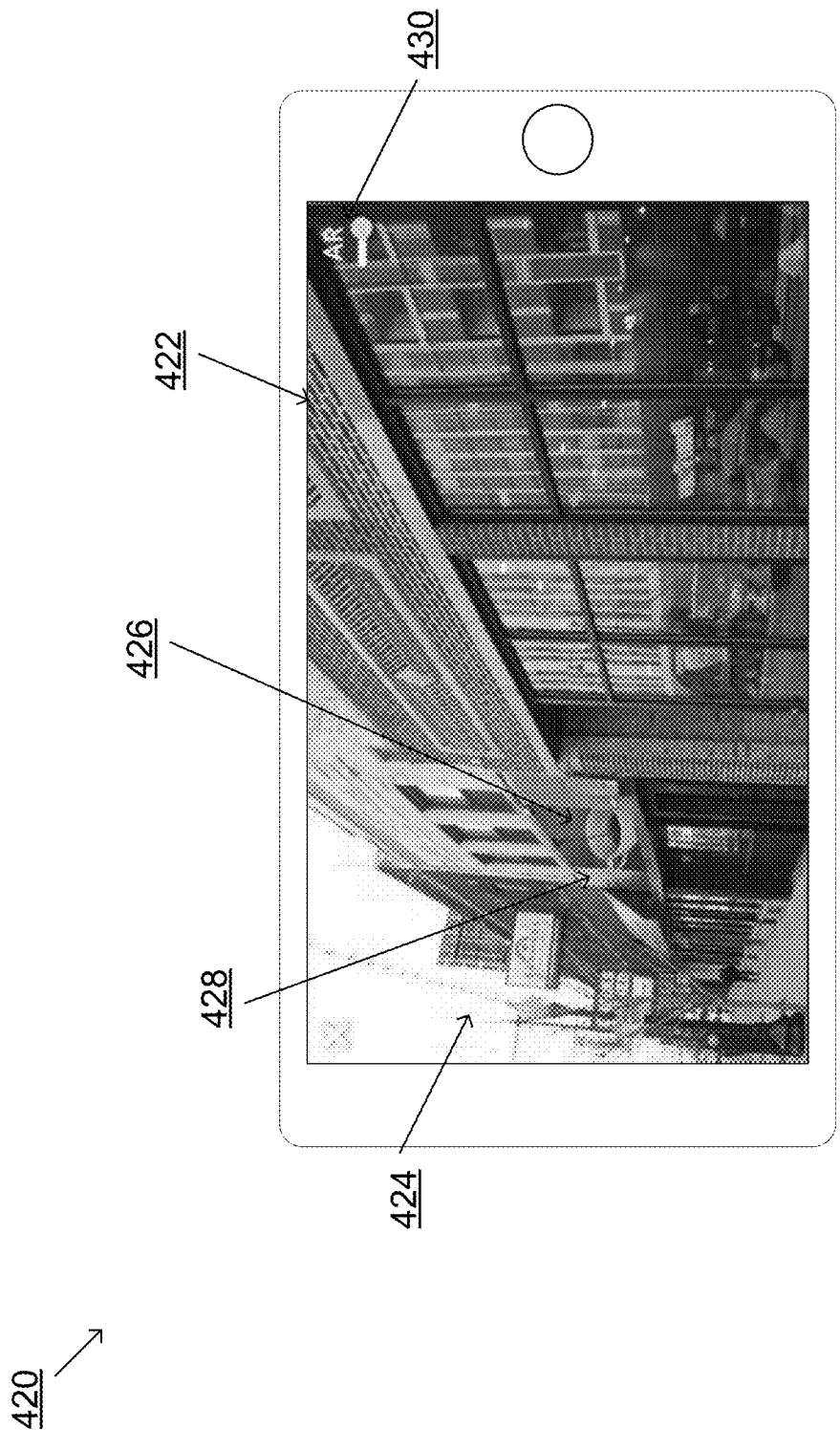
Figure 4C:
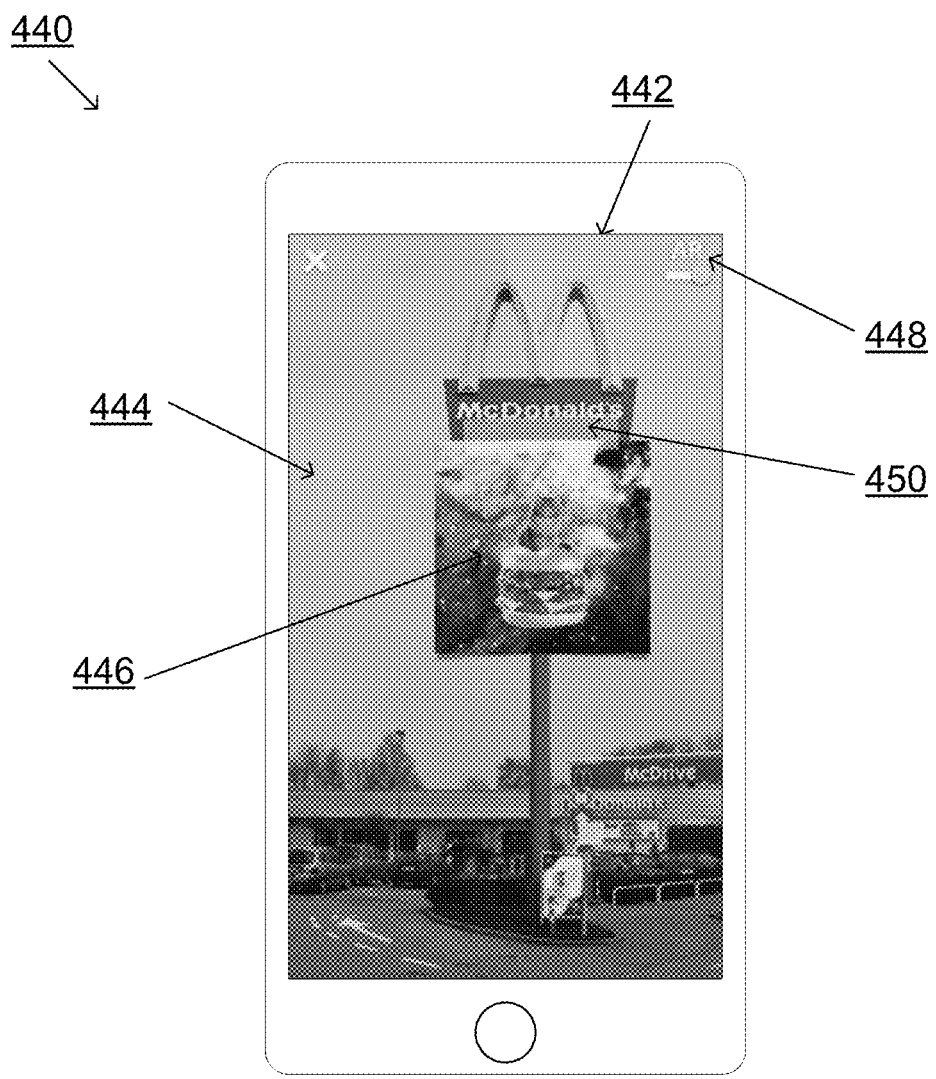

FIGS. 4A through 4C illustrate examples of a prerecorded video file superimposed over a video positioned relative to an object within the video, in accordance with various embodiments. FIG. 4A illustrates an example mobile electronic device 400 having a display 402. As illustrated, display 402 is displaying video 404, where video 404 depicts a scene of a business location (e.g., a local coffee shop). In one embodiment, video 404 is a live video captured by a video capture device (e.g., a rear-facing camera) of mobile electronic device 400. It should be appreciated that in accordance with other embodiments, video 404 may be captured at another mobile electronic device, and transmitted to mobile electronic device 400 for rendering on display 402, either in real-time (e.g., live) or time delayed.

In one embodiment, video 404 is rendered via a camera application of mobile electronic device 400. In another embodiment, video 404 is rendered via an application of mobile electronic device 400 for superimposing a prerecorded video file over video 404. It should be appreciated that the superimposing of a prerecorded video file over a video may be performed at a standalone application of mobile electronic device 400 or via a plugin/modification of an existing application of mobile electronic device 400. In one embodiment, the superimposing of a prerecorded video file over video 404 is executed responsive to a user interaction with control element 410. Control element 410 is operable to activate/deactivate the superimposing of a prerecorded video file over video 404.

Mobile electronic device 400 also plays prerecorded video file 406 over video 404. Prerecorded video file 406, as illustrated, includes subject matter related to the business location illustrated in video 404. In some embodiments, prerecorded video file 406 is selected based on the location of the scene of video 404. For example, since video 404 is a video of a local coffee shop, prerecorded video file 406 depicts pouring and preparation of a cup of coffee, so as to entice the user of mobile electronic device 400 to visit the coffee shop.

As illustrated, video 404 depicts a flat surface 408 within the depicted scene. Flat surface 408 may be, for example, a signage region of the business may be a flat surface or a wall facing may be a flat region. Using depth information, mobile electronic device 400 is operable to position prerecorded video file 406 such that it appears to be integrated within flat surface 408. It should be appreciated that in some embodiments, prerecorded video file 406 is positioned within display 402 so as to not obscure important visual elements of video 404 (e.g., the name of the business location, the logo of the business location, etc.)

FIG. 4B illustrates an example mobile electronic device 420 having a display 422. As illustrated, display 422 is displaying video 424, where video 424 depicts a scene of a business location (e.g., a local coffee shop). In one embodiment, video 424 is a live video captured by a video capture device (e.g., a rear-facing camera) of mobile electronic device 420. It should be appreciated that in accordance with other embodiments, video 424 may be captured at another mobile electronic device, and transmitted to mobile electronic device 420 for rendering on display 422, either in real-time (e.g., live) or time delayed.

In one embodiment, video 424 is rendered via a camera application of mobile electronic device 420. In another embodiment, video 424 is rendered via an application of mobile electronic device 420 for superimposing a prerecorded video file over video 424. It should be appreciated that the superimposing of a prerecorded video file over a video may be performed at a standalone application of mobile electronic device 420 or via a plugin/modification of an existing application of mobile electronic device 420. In one embodiment, the superimposing of a prerecorded video file over video 424 is executed responsive to a user interaction with control element 430. Control element 430 is operable to activate/deactivate the superimposing of a prerecorded video file over video 424.

Mobile electronic device 420 also plays prerecorded video file 426 over video 424. Prerecorded video file 426, as illustrated, includes subject matter related to the business location illustrated in video 424. In some embodiments, prerecorded video file 426 is selected based on the location of the scene of video 424. For example, since video 424 is a video of a local coffee shop, prerecorded video file 426 depicts pouring and preparation of a cup of coffee, so as to entice the user of mobile electronic device 420 to visit the coffee shop.

As illustrated, video 424 depicts a flat surface 428 within the depicted scene. Due to the viewing angle of video 424, flat surface 428 is shown in perspective. Flat surface 428 may be, for example, a signage region of the business may be a flat surface or a wall facing may be a flat region. Using depth information, mobile electronic device 420 is operable to position prerecorded video file 426 in perspective such that it appears to be integrated within flat surface 428. It should be appreciated that in some embodiments, prerecorded video file 426 is positioned within display 422 so as to not obscure important visual elements of video 424 (e.g., the name of the business location, the logo of the business location, etc.)

In one embodiment, video 444 is rendered via a camera application of mobile electronic device 440. In another embodiment, video 444 is rendered via an application of mobile electronic device 440 for superimposing a prerecorded video file over video 444. It should be appreciated that the superimposing of a prerecorded video file over a video may be performed at a standalone application of mobile electronic device 440 or via a plugin/modification of an existing application of mobile electronic device 440. In one embodiment, the superimposing of a prerecorded video file over video 444 is executed responsive to a user interaction with control element 410. Control element 410 is operable to activate/deactivate the superimposing of a prerecorded video file over video 444.

Mobile electronic device 440 also plays prerecorded video file 446 over video 444. Prerecorded video file 446, as illustrated, includes subject matter related to the business location illustrated in video 444. In some embodiments, prerecorded video file 446 is selected based on the location of the scene of video 444. For example, since video 444 is a video of a McDonald's restaurant, prerecorded video file 446 depicts a cat sitting atop a McDonald's hamburger floating in space, so as to entice the user of mobile electronic device 440 to visit the McDonald's restaurant.

As illustrated, video 444 depicts a sign within the depicted scene. Using depth information, mobile electronic device 440 is operable to position prerecorded video file 446 such that it appears to be affixed to the sign. It should be appreciated that in some embodiments, prerecorded video file 446 is positioned within display 442 so as to not obscure important visual elements of video 444 (e.g., the name of the business location, the logo of the business location, etc.)

In one embodiment, static element 450 is also rendered on display 442. Static element 450 is an element for visually indicating that prerecorded video file 446 is virtually held in place in space. For example, as illustrated, static element 450 depicts a piece of tape, indicating that prerecorded video file 446 is virtually affixed to the sign depicted in video 444. Other examples of static element 450 include a picture frame, a staple, an easel, etc.

Figure 5A:
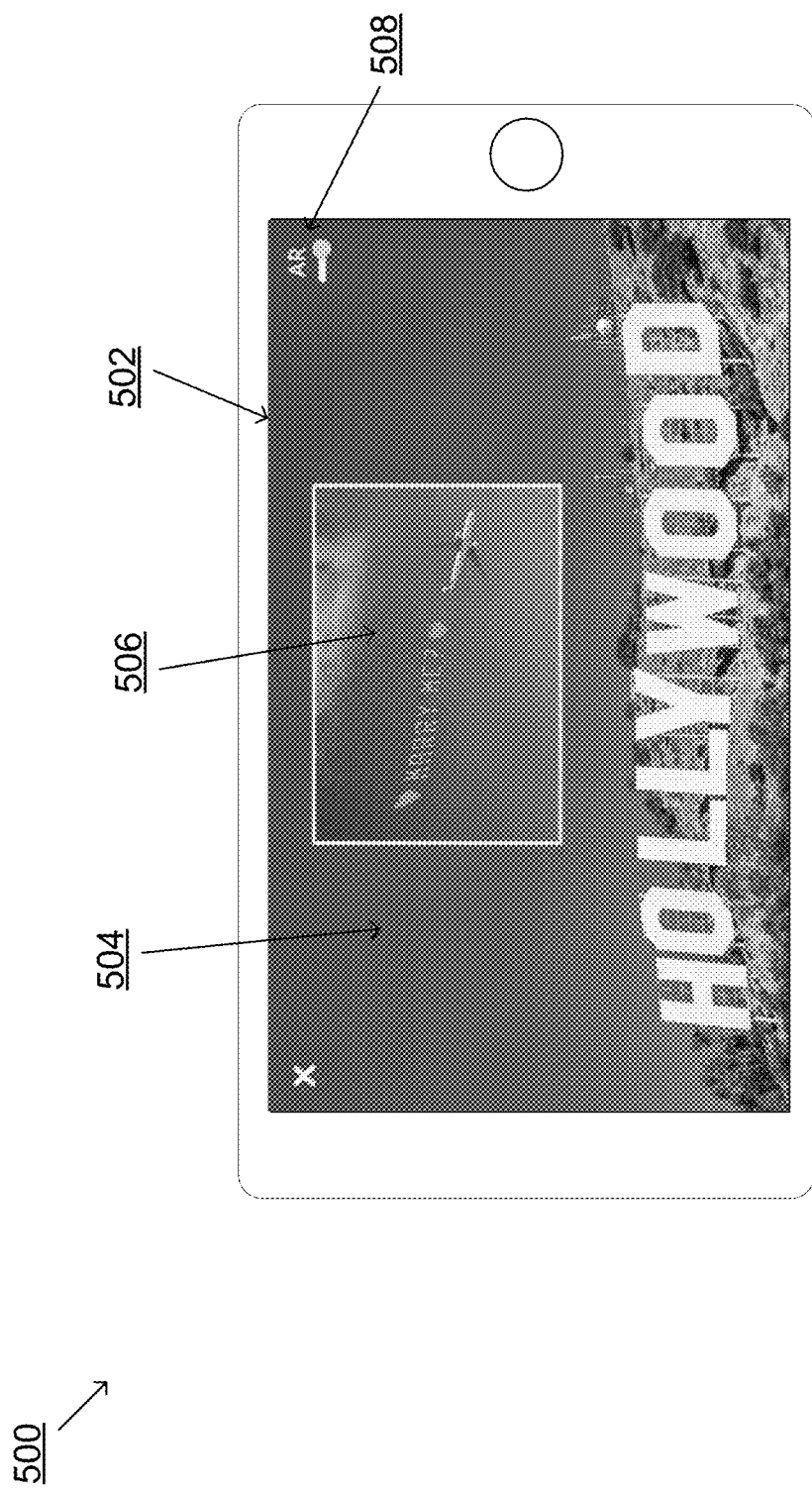
FIGS. 5A through 5C illustrate examples of a user-generated prerecorded video file superimposed over a video positioned relative to an object within the video, in accordance with various embodiments.
Figure 5B:
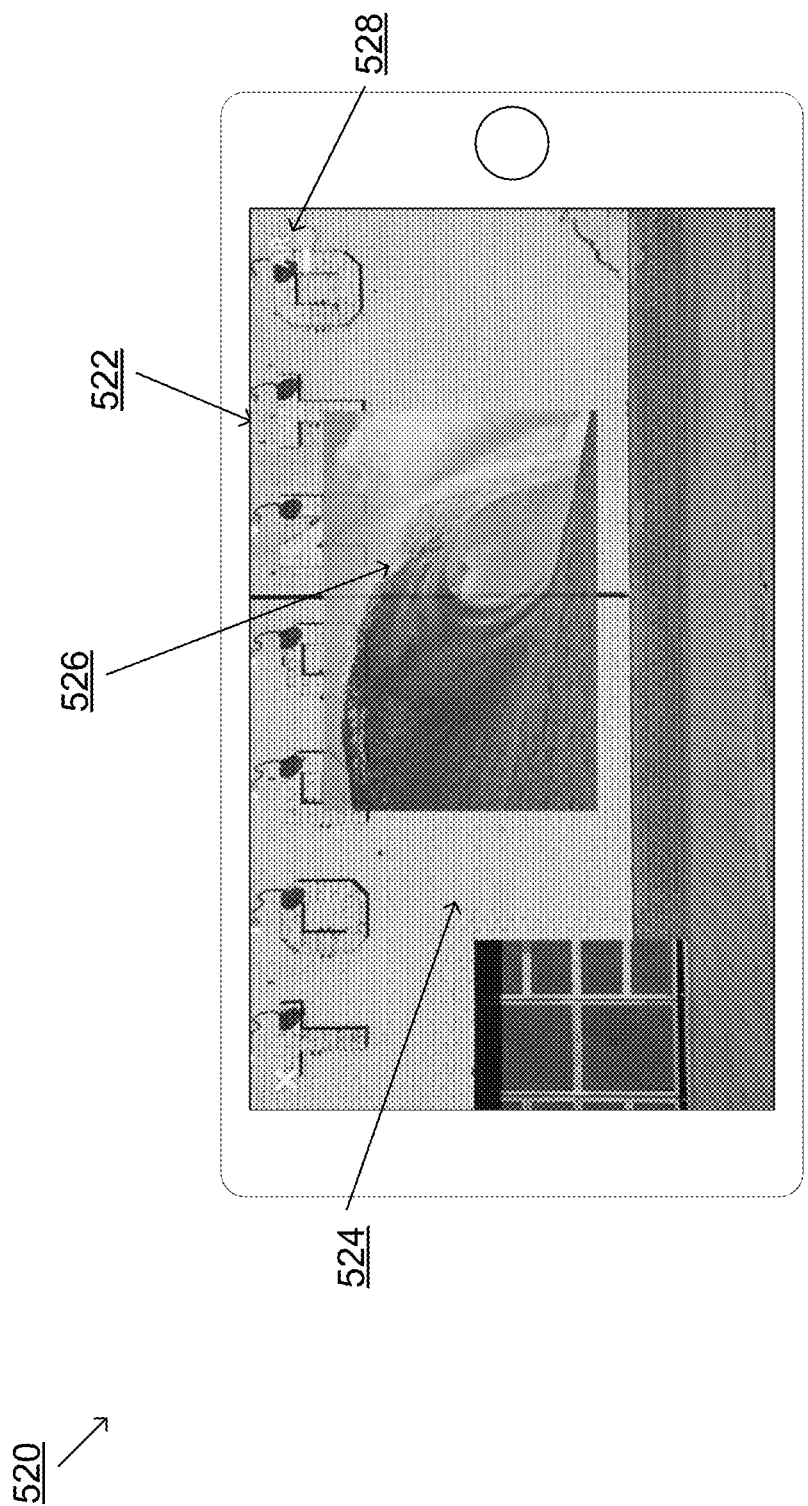
Figure 5C:
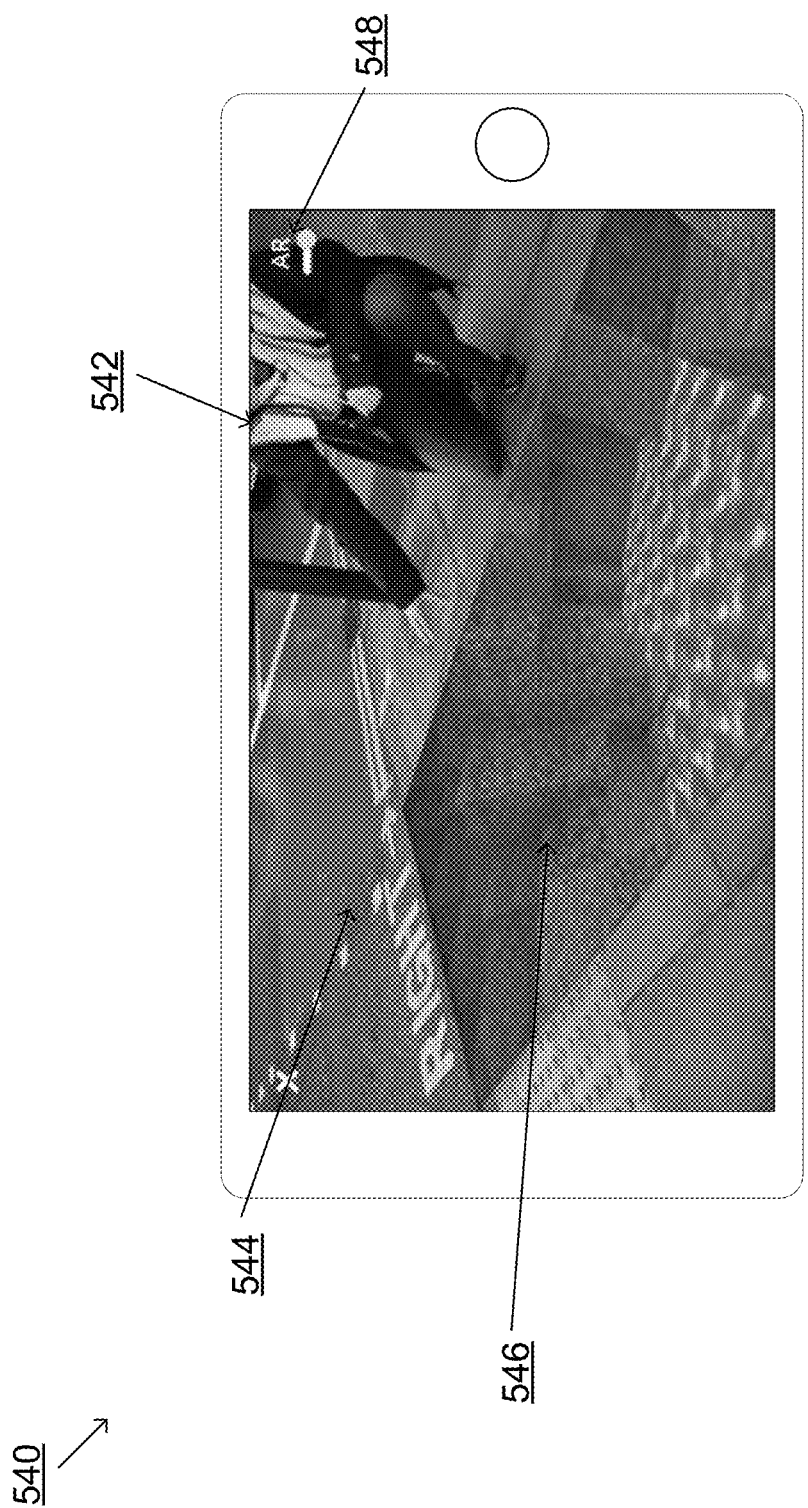

In some embodiments, user-generated content may be used to enhance objects within scenes. FIGS. 5A through 5C illustrate examples of a user-generated prerecorded video file superimposed over a video positioned relative to an object within the video, in accordance with various embodiments.

FIG. 5A illustrates an example mobile electronic device 500 having a display 502. As illustrated, display 502 is displaying video 504, where video 504 depicts a scene of a particular geography (e.g., the Hollywood sign). In one embodiment, video 504 is a live video captured by a video capture device (e.g., a rear-facing camera) of mobile electronic device 500. It should be appreciated that in accordance with other embodiments, video 504 may be captured at another mobile electronic device, and transmitted to mobile electronic device 500 for rendering on display 502, either in real-time (e.g., live) or time delayed.

In one embodiment, video 504 is rendered via a camera application of mobile electronic device 500. In another embodiment, video 504 is rendered via an application of mobile electronic device 500 for superimposing a prerecorded video file over video 504. It should be appreciated that the superimposing of a prerecorded video file over a video may be performed at a standalone application of mobile electronic device 500 or via a plugin/modification of an existing application of mobile electronic device 500. In one embodiment, the superimposing of a prerecorded video file over video 504 is executed responsive to a user interaction with control element 508. Control element 508 is operable to activate/deactivate the superimposing of a prerecorded video file over video 504.

Mobile electronic device 500 also plays prerecorded video file 506 over video 504. Prerecorded video file 506, as illustrated, is a user-generated video file that conveys information desired by the creator that is received and superimposed over video 504 responsive to determining a location associated with prerecorded video file 506. In the illustrated example, prerecorded video file 506 includes a depiction of an airplane dragging a banner including the message "Marry me?" which may be specific to a particular user of mobile electronic device 500. Prerecorded video file 506 enhances the experience of the user of mobile electronic device 500 by conveying a particular message to that user. It should be appreciated that in some embodiments, prerecorded video file 506 is positioned within display 502 so as to not obscure important visual elements of video 504 (e.g., the name of the business location, the logo of the business location, etc.)

FIG. 5B illustrates an example mobile electronic device 520 having a display 522. As illustrated, display 522 is displaying video 524, where video 524 depicts a scene of a blank wall in a city environment. In one embodiment, video 524 is a live video captured by a video capture device (e.g., a rear-facing camera) of mobile electronic device 520. It should be appreciated that in accordance with other embodiments, video 524 may be captured at another mobile electronic device, and transmitted to mobile electronic device 520 for rendering on display 522, either in real-time (e.g., live) or time delayed.

In one embodiment, video 524 is rendered via a camera application of mobile electronic device 520. In another embodiment, video 524 is rendered via an application of mobile electronic device 520 for superimposing a prerecorded video file over video 524. It should be appreciated that the superimposing of a prerecorded video file over a video may be performed at a standalone application of mobile electronic device 520 or via a plugin/modification of an existing application of mobile electronic device 520. In one embodiment, the superimposing of a prerecorded video file over video 524 is executed responsive to a user interaction with control element 528. Control element 528 is operable to activate/deactivate the superimposing of a prerecorded video file over video 524.

Mobile electronic device 520 also plays prerecorded video file 526 over video 524. Prerecorded video file 526, as illustrated, is a user-generated video file that conveys information desired by the creator. In the illustrated example, prerecorded video file 526 includes a depiction of an ocean scene. Prerecorded video file 526 enhances the experience of the user of mobile electronic device 520 by conveying a particular message to that user. The illustrated example allows a user to beautify selected types of surroundings (e.g., blank walls) with video enhancements (e.g., waves crashing). For example, a user of mobile electronic device 520 may subscribe to a feed via a social network that enhances features of scenes. It should be appreciated that in some embodiments, prerecorded video file 526 is positioned within display 522 so as to not obscure important visual elements of video 524 (e.g., the name of the business location, the logo of the business location, etc.)

FIG. 5C illustrates an example mobile electronic device 540 having a display 542. As illustrated, display 542 is displaying video 544, where video 544 depicts a scene of a blank wall in a city environment. In one embodiment, video 544 is a live video captured by a video capture device (e.g., a rear-facing camera) of mobile electronic device 540. It should be appreciated that in accordance with other embodiments, video 544 may be captured at another mobile electronic device, and transmitted to mobile electronic device 540 for rendering on display 542, either in real-time (e.g., live) or time delayed.

In one embodiment, video 544 is rendered via a camera application of mobile electronic device 540. In another embodiment, video 544 is rendered via an application of mobile electronic device 540 for superimposing a prerecorded video file over video 544. It should be appreciated that the superimposing of a prerecorded video file over a video may be performed at a standalone application of mobile electronic device 540 or via a plugin/modification of an existing application of mobile electronic device 540. In one embodiment, the superimposing of a prerecorded video file over video 544 is executed responsive to a user interaction with control element 548. Control element 548 is operable to activate/deactivate the superimposing of a prerecorded video file over video 544.

Mobile electronic device 540 also plays prerecorded video file 546 over video 544. Prerecorded video file 546, as illustrated, is a user-generated video file that conveys information desired by the creator. In the illustrated example, prerecorded video file 546 includes a depiction of computer-generated molten lava scene that overlays a sidewalk. Prerecorded video file 546 enhances the experience of the user of mobile electronic device 540 by conveying a particular message to that user. The illustrated example allows a user to visually transform selected types of surroundings (e.g., sidewalks, roads, pavement, etc.) with video enhancements (e.g., rushing water, molten lava, etc.). For example, a user of mobile electronic device 540 may subscribe to a feed via a social network that enhances features of scenes. It should be appreciated that in some embodiments, prerecorded video file 546 is positioned within display 542 so as to not obscure important visual elements of video 544 (e.g., the name of the business location, the logo of the business location, etc.)

Figure 6:
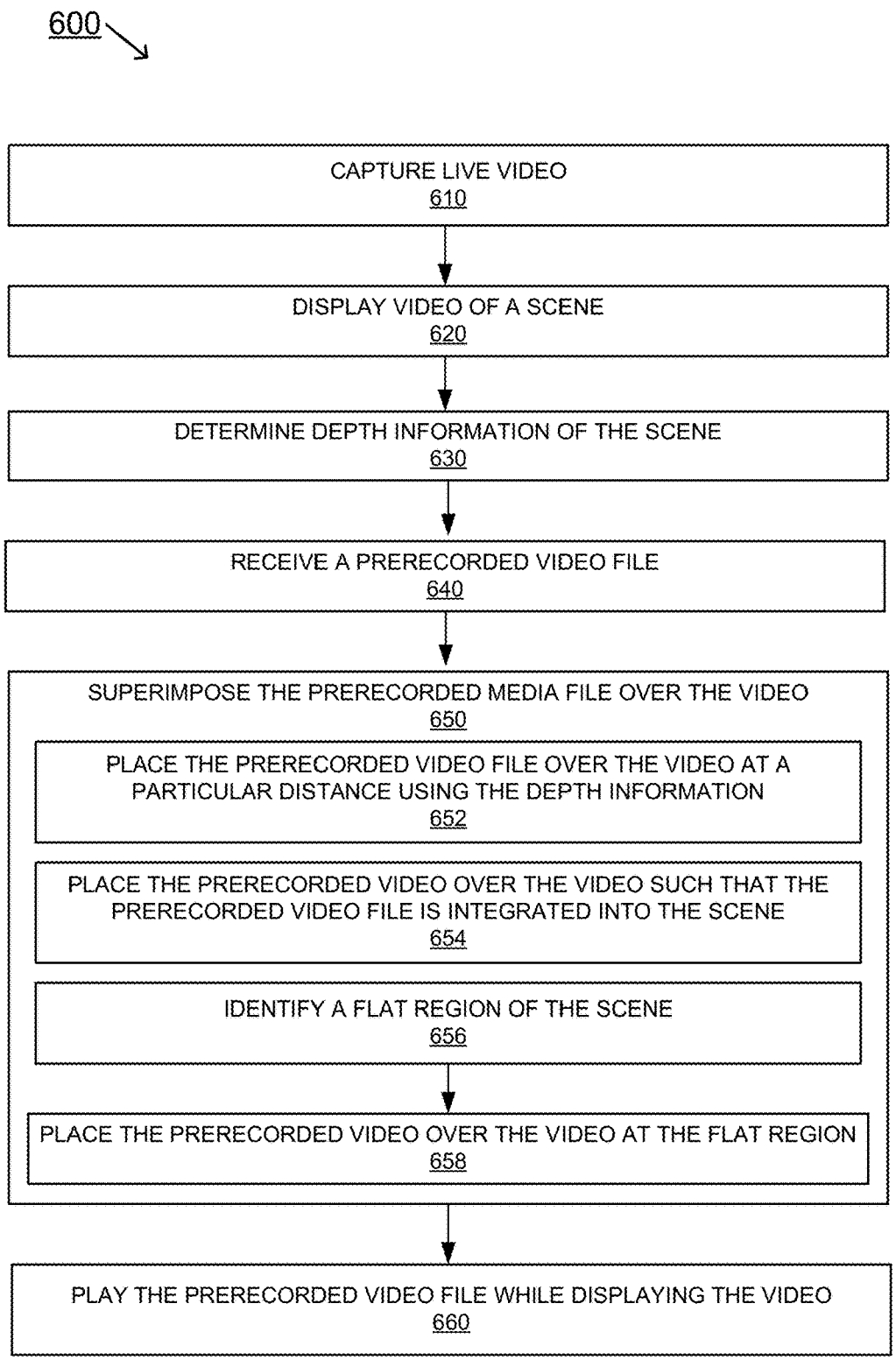
FIG. 6 illustrates a flow diagram of an example method for superimposing a prerecorded media file into a video, according to various embodiments.

Example Methods of Operation of Superimposing Prerecorded Video Files into a Video FIG. 6 illustrates a flow diagram 600 of an example method for superimposing a prerecorded media file into a video, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software.

In one embodiment, as shown at procedure 610 of flow diagram 600, live video is captured at a video capture device (e.g., optical sensor 135) of a mobile electronic device (e.g., mobile electronic device 100). At procedure 620, a video of a scene is displayed on a display device (e.g., display 140) of the mobile electronic device. In one embodiment, the video is live video captured at procedure 610.

In some embodiments, as shown at procedure 630, depth information of the scene captured within the video is determined. The depth information defines distances of points of the scene from a video capture device, such that the depth information comprises relative depths of the points of the scene based on a position of the video capture device.

At procedure 640, a prerecorded video file to render on the display device is received. At procedure 650, the prerecorded video file is superimposed over the video, such that the video is partially obscured by the prerecorded video file. The prerecorded video file is played while displaying the video, such that the prerecorded video file and a non-obscured portion of the video are rendered simultaneously. In some embodiments, the prerecorded video file is selectable for interactivity, wherein a user interaction with the prerecorded video file initiates an action. (e.g., navigate to a particular website, show content, transform the prerecorded video file, etc.)

In one embodiment, as shown at procedure 652, the prerecorded video file is placed over the video at a particular distance from the position of the video capture device based on the depth information. In another embodiment, as shown at procedure 654, the prerecorded video file is placed over the video at the distances that the points of the scene are from the video capture device based on the depth information, such that the prerecorded video file is visually integrated into the scene. In one embodiment, the depth information includes surface contours of objects within the scene, such that the prerecorded video file is placed over the video following the surface contours of the objects. In another embodiment, as shown at procedure 656, a flat region of the scene within the video is identified based on the depth information. At procedure 658, the prerecorded video file is placed over the video at the flat region of the scene, such that the prerecorded video file is visually integrated into the scene at the flat region.

At procedure 660, the prerecorded video file is played while displaying the video, such that the prerecorded video file and a non-obscured portion of the video are rendered simultaneously.

Figure 7A:
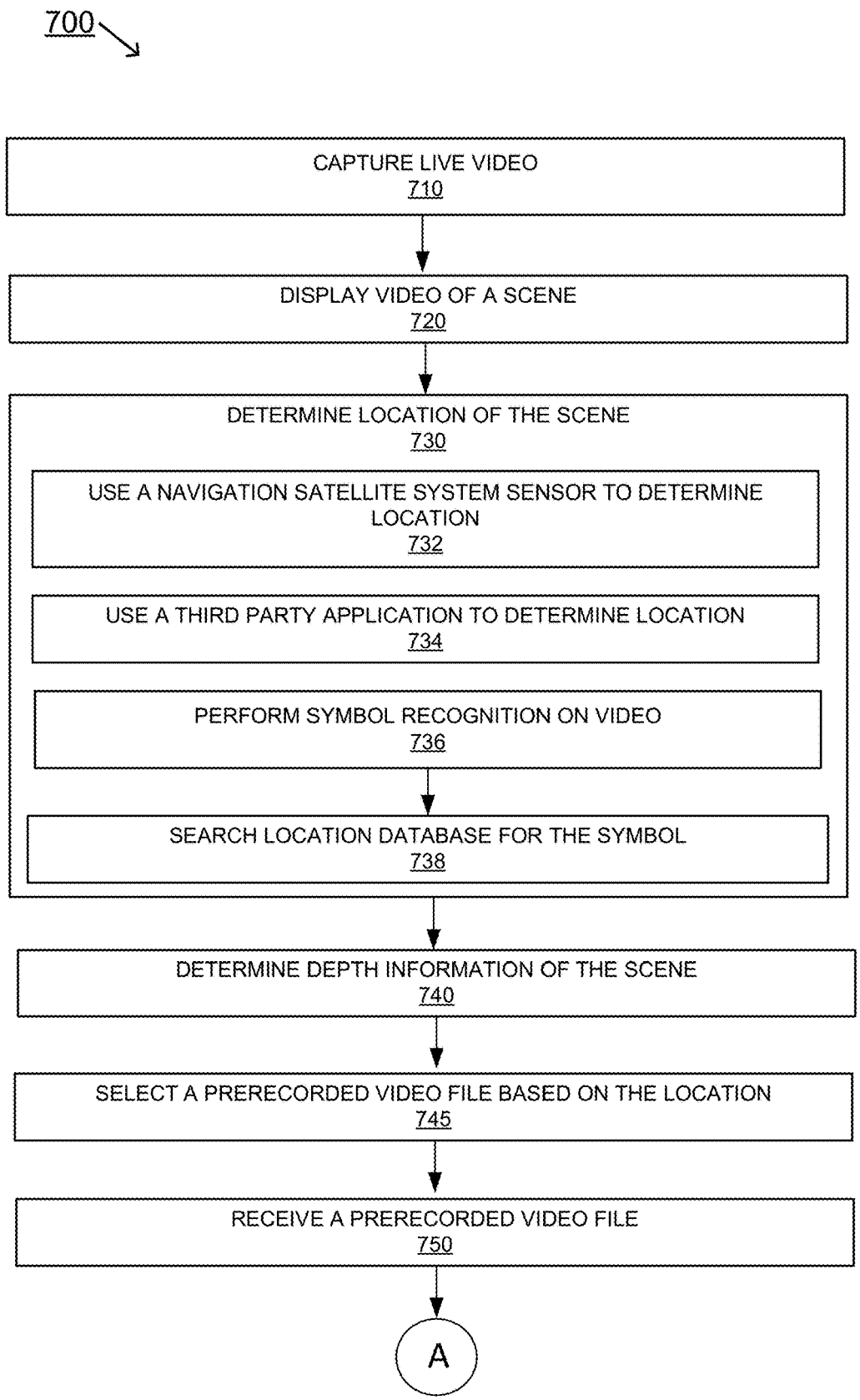
FIGS. 7A and 7B illustrates a flow diagram of an example method for selecting of a prerecorded media file for superimposing into a video, according to various embodiments.
Figure 7B:
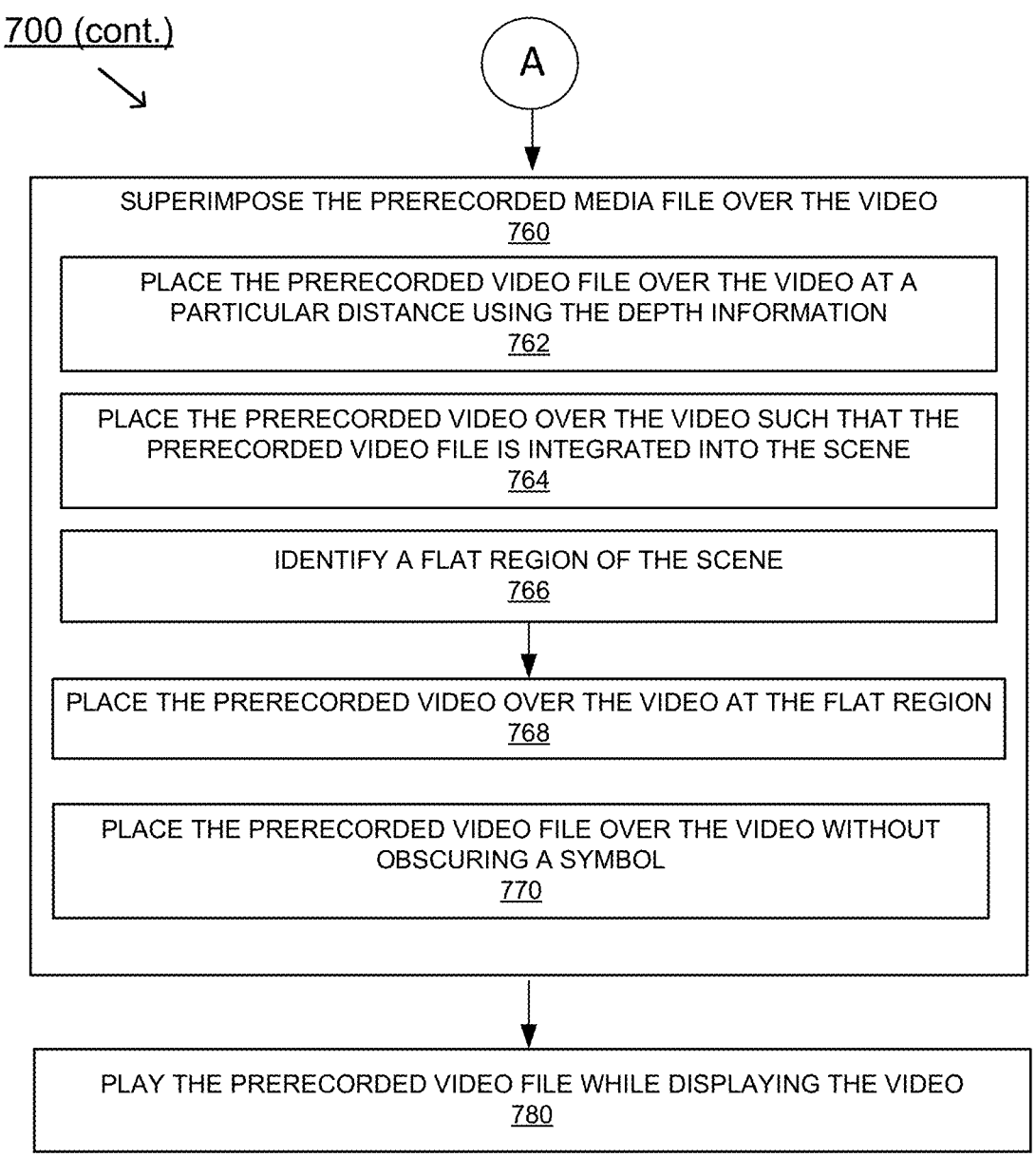

FIGS. 7A and 7B illustrate a flow diagram 700 of an example method for selecting of a prerecorded media file for superimposing into a video, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-readable storage media. It is further appreciated that one or more procedures described in flow diagram 700 may be implemented in hardware, or a combination of hardware with firmware and/or software.

With reference to FIG. 7A, in one embodiment, as shown at procedure 710 of flow diagram 700, live video is captured at a video capture device (e.g., optical sensor 135) of a mobile electronic device (e.g., mobile electronic device 100). At procedure 720, a video of a scene is displayed on a display device (e.g., display 140) of the mobile electronic device. In one embodiment, the video is live video captured at procedure 710.

At procedure 730, a location of the scene is determined. In one embodiment, as shown at procedure 732, the location of the scene is determined using a navigation satellite system sensor (e.g., location sensor 170) of the mobile electronic device. In another embodiment, as shown at procedure 734, the location of the scene is determined using a third party application (e.g., Foursquare, Yelp). In another embodiment, as shown at procedure 736, symbol recognition is performed on the video to identify at least one symbol (e.g., logo, word, phrase, etc.) At procedure 738, a location database is searched for the symbol to determine the location.

In some embodiments, as shown at procedure 740, depth information of the scene captured within the video is determined. The depth information defines distances of points of the scene from a video capture device, such that the depth information comprises relative depths of the points of the scene based on a position of the video capture device.

At procedure 745, a prerecorded video file to render on the display device is selected based on the location determined at procedure 730. At procedure 750, a prerecorded video file to render on the display device is received.

With reference to FIG. 7B, at procedure 760, the prerecorded video file is superimposed over the video, such that the video is partially obscured by the prerecorded video file. The prerecorded video file is played while displaying the video, such that the prerecorded video file and a non-obscured portion of the video are rendered simultaneously. In some embodiments, the prerecorded video file is selectable for interactivity, wherein a user interaction with the prerecorded video file initiates an action. (e.g., navigate to a particular website, show content, transform the prerecorded video file, etc.)

In one embodiment, as shown at procedure 762, the prerecorded video file is placed over the video at a particular distance from the position of the video capture device based on the depth information. In another embodiment, as shown at procedure 764, the prerecorded video file is placed over the video at the distances that the points of the scene are from the video capture device based on the depth information, such that the prerecorded video file is visually integrated into the scene. In one embodiment, the depth information includes surface contours of objects within the scene, such that the prerecorded video file is placed over the video following the surface contours of the objects. In another embodiment, as shown at procedure 766, a flat region of the scene within the video is identified based on the depth information. At procedure 768, the prerecorded video file is placed over the video at the flat region of the scene, such that the prerecorded video file is visually integrated into the scene at the flat region. In one embodiment, as shown at procedure 770, the prerecorded video file is placed over the video without obscuring the at least one symbol.

At procedure 780, the prerecorded video file is played while displaying the video, such that the prerecorded video file and a non-obscured portion of the video are rendered simultaneously.

Example Integration of Prerecorded Video Files into a Video

Presenting visual information to users in an electronic medium (e.g., display screens of electronic devices) provides new opportunities for enhancing the user experience of viewing visual information on the electronic medium. When information is presented to a user, it is desirable to present the information in a pleasing and agreeable manner. Moreover, when presenting information on mobile electronic devices, performance and power usage of the mobile electronic device is an important consideration. For example, while some computer-generated images or structures may be rendered on a display device, processing such images and structures can be computationally expensive, hampering performance of and causing rapid power source depletion of some mobile electronic devices.

Embodiments described herein improve the presentation of information to users by visually integrating the information into a scene, thereby providing a pleasing and visually appealing experience for a user. A video of a scene is displayed on the display device of a mobile electronic device. In some embodiments, the video is a live scene captured by an optical sensor (e.g., camera) of the mobile electronic device. A prerecorded video file is integrated into the scene, enhancing the visual experience of the user. The described embodiments improve the technology of communicating information by integrating prerecorded media files into the real world while engaging with the real world.

In accordance with the described embodiments, a prerecorded video file (e.g., a short form looping video file) is modified to visually integrate into the scene presented by the video. By presenting a prerecorded video file into the scene, rather than a computer-generated graphic, performance of the computer system is improved by not unnecessarily presenting communications in a manner that is less effective, thereby not wasteful of processing bandwidth and/or power consumption of mobile devices.

In accordance with various embodiments, devices and methods for modifying a prerecorded media file and superimposing the modified prerecorded media file into a video are provided. A video of a scene is displayed on a display device of a mobile electronic device. A prerecorded video file to render on the display device is received. A modified prerecorded video file is generated by modifying the prerecorded video file, wherein the modifying is for visually integrating the modified prerecorded video file into the scene. The modified prerecorded video file is superimposed over the video, such that the video is partially obscured by the prerecorded video file. The modified prerecorded video file is played while displaying the video, such that the modified prerecorded video file and a non-obscured portion of the video are rendered simultaneously. In some embodiments, live video is captured at a video capture device of the mobile electronic device, such that the video displayed on the display device is the live video.

Embodiments described herein pertain to superimposing a modified prerecorded media file into a video. In one embodiment, the prerecorded media file is a Graphics Interchange Format (GIF) file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat.

In some embodiments, a modification selection defining the modifying of the visual appearance of the prerecorded video file received. In one embodiment, the modification selection includes a graphical object for placement into the video of the scene, wherein the graphical object is a three-dimensional model. In one embodiment, the visual appearance of the prerecorded video file is modified by superimposing the prerecorded video file onto a region of the graphical object. It should be appreciated that the region of the graphical object upon which the prerecorded video file is superimposed may be flat (e.g., two-dimensional) or non-flat (e.g., three-dimensional).

In one embodiment, where the region of the graphical object upon which the prerecorded video file is superimposed is non-flat, a mesh that conforms to a shape of the region is received. The mesh is applied to the prerecorded video file. The prerecorded video file is superimposed onto the region of the graphical object as a texture based on the mesh.

In one embodiment, while the modified prerecorded video file is played, the graphical object is maintained in an orientation orthogonal to a camera angle of the video. For example, where live video is displayed on the display device of the mobile electronic device, as the mobile electronic device moves through space the live video also moves, allowing the user to navigate through space. In the current example, the graphical object of the modified prerecorded video file is maintained in a static position relative to the camera (e.g., the user) despite the live video moving behind the graphical object.

In other embodiments, the modification selection includes a graphical modification of the prerecorded video file. In one embodiment, the visual appearance of the prerecorded video file is modified by applying the graphical modification to the prerecorded video file to generate the modified prerecorded video file. For example, the graphical modification can include at least one of, without limitation: blurring a portion of the prerecorded video file, smoothing a portion of the prerecorded video file, applying a filter to a portion of the prerecorded video file, removing a background of the prerecorded video file, and adding a graphical object to the prerecorded video file.

It should be appreciated that the prerecorded video file can be both modified according to one or more graphical modifications and adding a graphical object to the prerecorded video file, where the prerecorded video file can be superimposed onto the graphical object or placed proximate the graphical object. It should further be appreciated that the embodiments described herein provide for visually modifying a prerecorded video file such that the modified prerecorded video file is visually integrated into a scene displayed on the video, thereby enhancing the user experience.

Embodiments described herein may be implemented on example communication network 240 of FIG. 2. It should be appreciated that electronic device 210 may be implemented as a mobile electronic device 100, and/or include any combination of the components of mobile electronic device 100. It should be appreciated that the modification of a prerecorded video file may be performed at electronic device 210, remote computer system 230, or other computer system communicatively coupled to network 240. It should further be appreciated that, in accordance with various embodiments, a modified prerecorded video files described herein may be used in conjunction with and/or in lieu of the prerecorded video files of FIGS. 3A through 5C.

Embodiments described herein provide for the modification of a prerecorded video file and superimposing the modified prerecorded video file over a video, where the modified prerecorded video file and non-obscured portion of the video are rendered simultaneously. FIGS. 8A through 10K illustrate examples of modifying a prerecorded video file and superimposing the modified prerecorded video file over a video, in accordance with various embodiments. It should be appreciated that the modified FIG. 8A illustrates an example prerecorded video file 800, according to an embodiment. In one embodiment, prerecorded video file 800 is GIF file. It should be appreciated that prerecorded video file 800 may be another type of video file, including but not limited to GIF, WebM, WebP, MPEG-4 (MP4), APNG, Motion JPEG, Flash video (FLV), Windows Media video, M4V, etc. It should be appreciated that prerecorded video file 800 can be looped on playback (e.g., via a HTML 5 video element or Flash video element) to automatically repeat. In some embodiments, prerecorded video file 800 is a short form looping prerecorded video file.

Figure 8C:
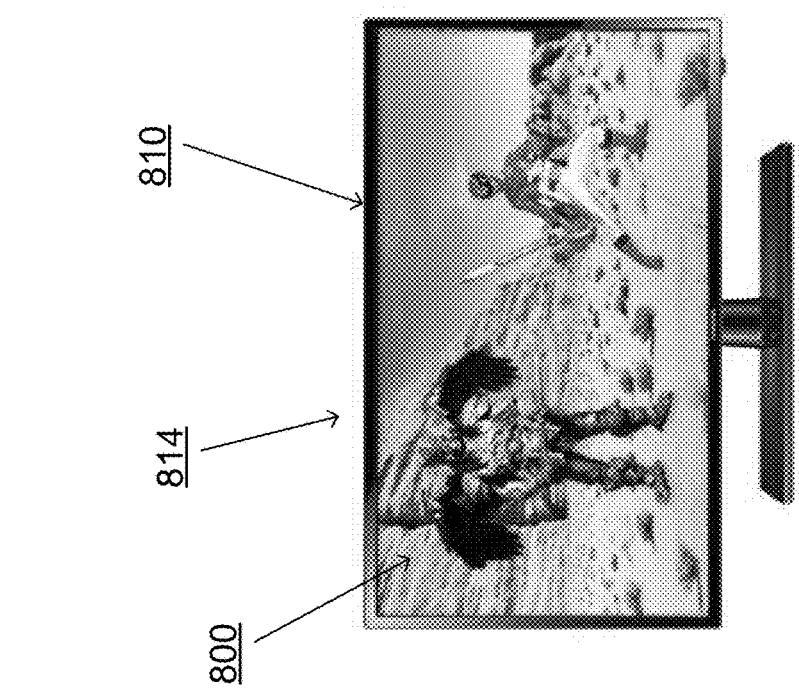
FIG. 8C illustrates an example of a modified prerecorded video file including a prerecorded video file superimposed onto a graphical object, according to an embodiment.
Figure 8A:
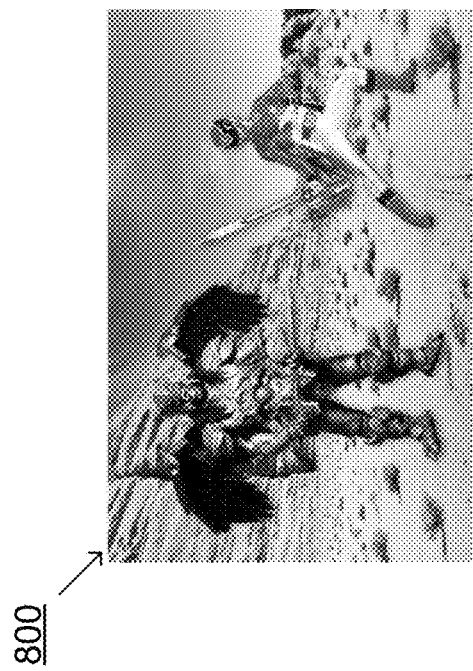
FIG. 8A illustrates an example prerecorded video file, according to an embodiment.
Figure 8B:
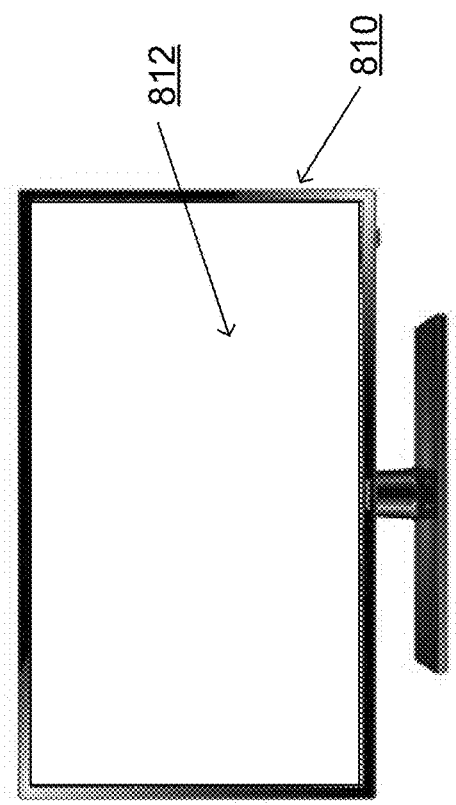
FIG. 8B illustrates an example graphical object upon which a prerecorded video file can be superimposed, according to an embodiment.

FIG. 8B illustrates an example graphical object 810 upon which prerecorded video file 800 can be superimposed, according to an embodiment. Graphical object 810 includes region 812 upon which prerecorded video file 800 can be superimposed. In the illustrated embodiment, region 812 is flat and substantially has the aspect ratio of prerecorded video file 800. As such, prerecorded video file 800 can be superimposed onto graphical object 810 at region 810 without additional modification of prerecorded video file 800.

As illustrated, graphical object 810 is a computer display (e.g., an LCD display). However, it should be appreciated that graphical object 810 can be any visual object. Graphical object 810, as illustrated, includes perspective that gives graphical object 810 the appearance of being a three-dimensional object. However, it should be appreciated that graphical object 810 can appear two-dimensional, two and a half dimensional, or three-dimensional.

FIG. 8C illustrates an example of modified prerecorded video file 814 including prerecorded video file 800 superimposed onto graphical object 810, according to embodiments. Modified prerecorded video file 814 is generated by superimposing prerecorded video file 800 onto region 812 of graphical object 810.

Figure 8E:
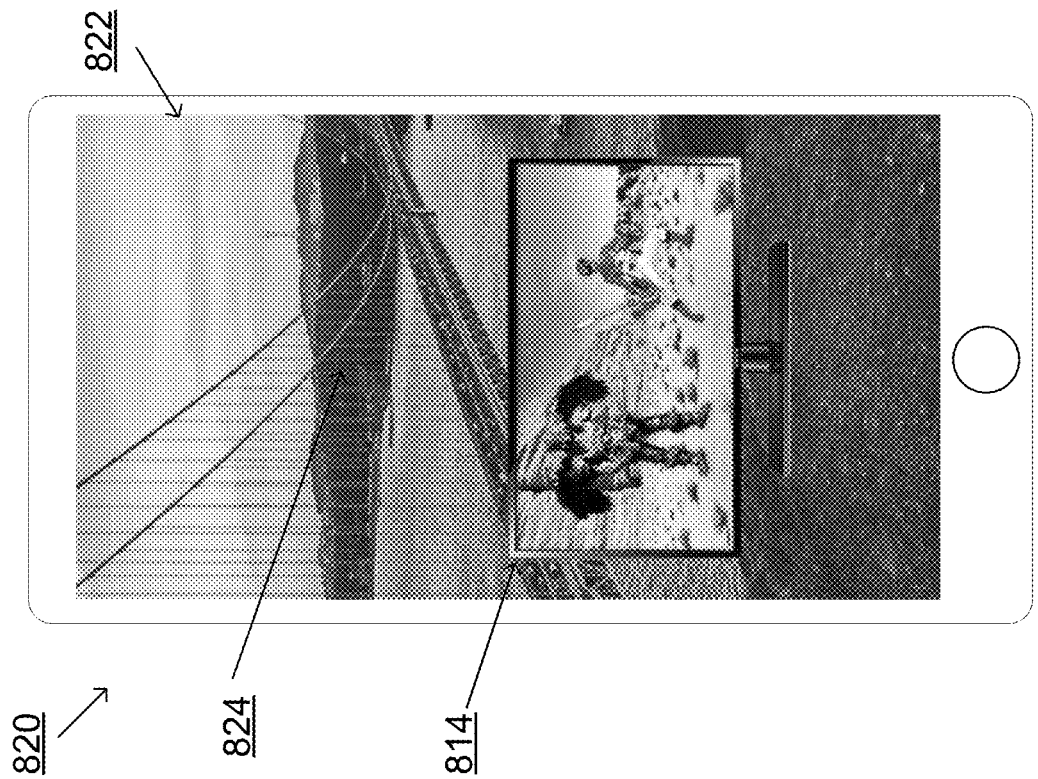
FIGS. 8D and 8E illustrate different views of an example modified prerecorded video file superimposed over a video, according to an embodiment.
Figure 8D:
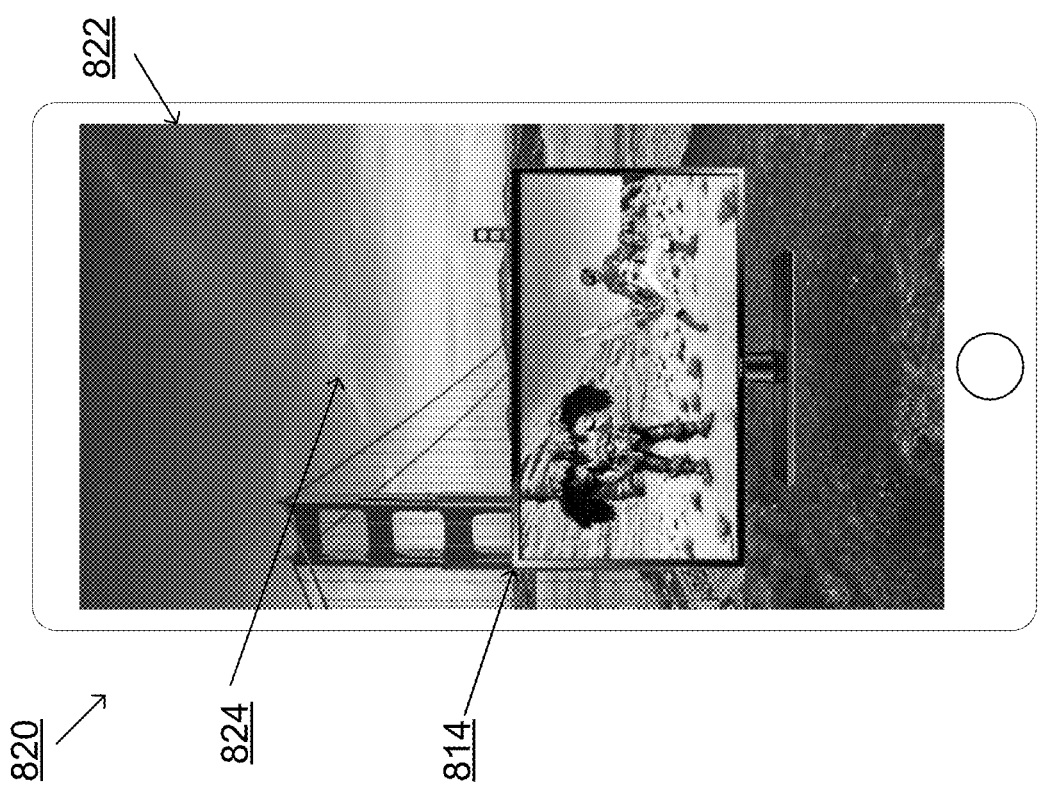

FIG. 8D illustrates a first view of an example mobile electronic device 820 having a display 822. As illustrated, display 822 is displaying video 824, where video 824 depicts a scene a live video captured by a video capture device (e.g., a rear-facing camera) of mobile electronic device 820. As illustrated, video 824 is displaying live video of a scene taken atop a bluff overlooking the San Francisco Bay and the Golden Gate Bridge.

In one embodiment, video 824 is rendered via a camera application of mobile electronic device 820. In another embodiment, video 824 is rendered via an application of mobile electronic device 820 for superimposing a prerecorded video file over video 824. It should be appreciated that the superimposing of a prerecorded video file (e.g., a modified prerecorded video file) over a video may be performed at a standalone application of mobile electronic device 820 or via a plugin/modification of an existing application of mobile electronic device 820. In one embodiment, the superimposing of a prerecorded video file over video 824 is executed responsive to a user interaction.

Mobile electronic device 820 also plays modified prerecorded video file 814 over video 824. Modified prerecorded video file 814, as illustrated, is placed in the scene such that it visually appears as if the graphical object of modified prerecorded video file 814 is sitting atop the bluff, visually integrating modified prerecorded video file 814 into the scene. It should be appreciated that the content of modified prerecorded video file 814 (e.g., prerecorded video file 800) may be selected as described above, in accordance with FIGS. 3A through 5C. Modified rerecorded video file 814 enhances the experience of the user of mobile electronic device 820 by integrating a prerecorded video file into a live scene. It should be appreciated that in some embodiments, modified prerecorded video file 814 is positioned within display 822 so as to not obscure important visual elements of video 824 (e.g., the name of a business location, the logo of a business location, etc.)

FIG. 8E illustrates a second view of example mobile electronic device 820. As illustrated, display 822 is displaying video 824, where video 824 depicts a scene a live video captured by a video capture device of mobile electronic device 820. As illustrated, video 824 is displaying live video of a scene taken atop a bluff overlooking the San Francisco Bay and the Golden Gate Bridge taken at a different viewing angle than the first view of FIG. 8D.

As illustrated in FIG. 8E, while the view of the San Francisco Bay and the Golden Gate Bridge has changed with respect to the viewer, the graphical object of modified prerecorded video file 814 maintains an orientation orthogonal to a camera angle of the video during the play of modified prerecorded video file 814. In other words, as a user of mobile electronic device 820 moves through space, changing the view of the live video displayed on display 822, the position of modified prerecorded video file 814 remains constant and static relative to the user, such that the user is presented with a consistent presentation of modified prerecorded video file 814.

Figure 8G:
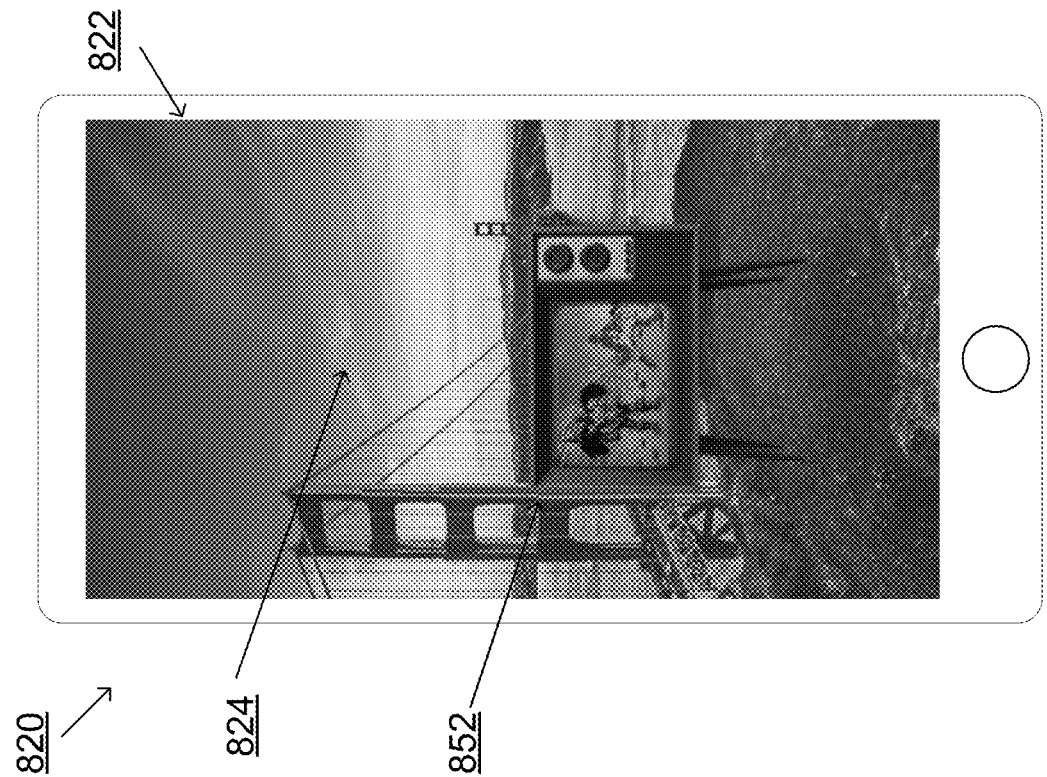
FIG. 8G illustrates another example modified prerecorded video file superimposed over a video, according to an embodiment.
Figure 8F:
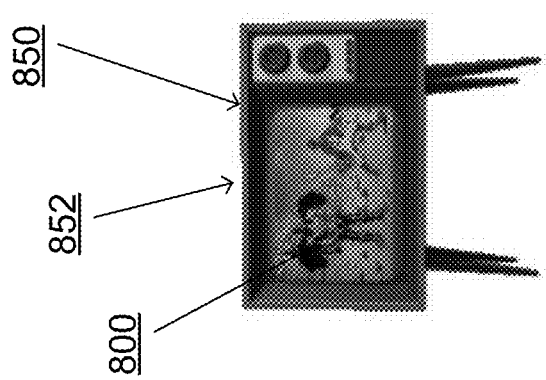
FIG. 8F illustrates another example of a modified prerecorded video file including a prerecorded video file superimposed onto a graphical object, according to an embodiment.

FIG. 8F illustrates another example of modified prerecorded video file 852 including prerecorded video file 800 superimposed onto graphical object 850, according to embodiments. Modified prerecorded video file 852 is generated by superimposing prerecorded video file 800 onto a region of graphical object 850. As illustrated, graphical object 850 is a cathode ray tube (CRT) television. However, it should be appreciated that graphical object 850 can be any visual object. Graphical object 850, as illustrated, includes perspective that gives graphical object 850 the appearance of being a three-dimensional object. However, it should be appreciated that graphical object 850 can appear two-dimensional, two and a half dimensional, or three-dimensional.

FIG. 8G illustrates another example view of mobile electronic device 820. As illustrated, display 822 is displaying video 824, where video 824 depicts a scene a live video captured by a video capture device (e.g., a rear-facing camera) of mobile electronic device 820. Mobile electronic device 820 also plays modified prerecorded video file 852 over video 824. Modified prerecorded video file 852, as illustrated, is placed in the scene such that it visually appears as if the graphical object of modified prerecorded video file 852 is sitting atop the bluff, visually integrating modified prerecorded video file 852 into the scene. It should be appreciated that the content of modified prerecorded video file 852 (e.g., prerecorded video file 800) may be selected as described above, in accordance with FIGS. 3A through 5C. Modified rerecorded video file 852 enhances the experience of the user of mobile electronic device 820 by integrating a prerecorded video file into a live scene. It should be appreciated that in some embodiments, modified prerecorded video file 852 is positioned within display 822 so as to not obscure important visual elements of video 824 (e.g., the name of a business location, the logo of a business location, etc.) Moreover, it should be appreciated that modified prerecorded video file 852 can maintains an orientation orthogonal to a camera angle of the video during the play of modified prerecorded video file 852.

In some embodiments, the region of the graphical object upon which the prerecorded video file is non-flat (e.g., three-dimensional). In such embodiments, a mesh is applied to the prerecorded video file that conforms to a shape of the region of the graphical object upon which the prerecorded video file is to be superimposed. The prerecorded video file is then superimposed onto the region of the graphical object as a texture based on the mesh.

Figure 9B:
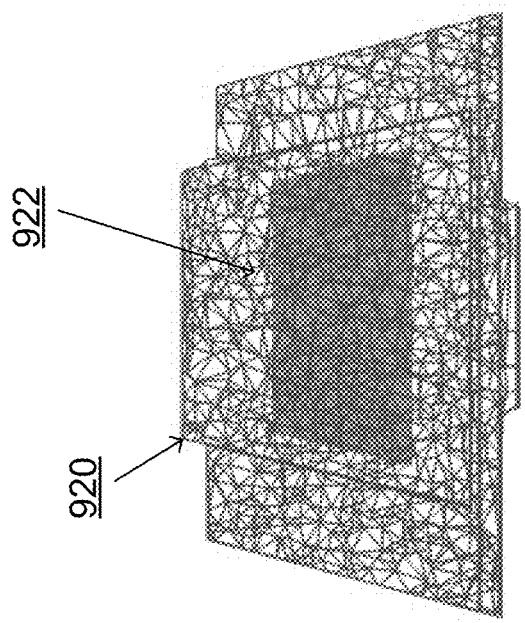
FIGS. 9A and 9B are example three-dimensional meshes for a prerecorded video file and a graphical object, in accordance with an embodiment.
Figure 9A:
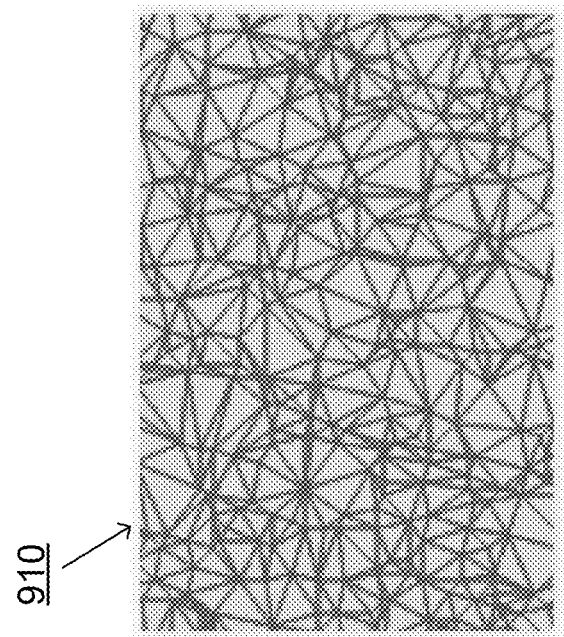

FIGS. 9A and 9B are example three-dimensional meshes 910 and 920 for a prerecorded video file and a graphical object, respectively, in accordance with an embodiment. For example, mesh 910 is applied to prerecorded video file 800. The mesh-applied prerecorded video file 800 is then applied to region 922 of mesh 920, which then is applied as a texture to the graphical object corresponding to mesh 920.

Figure 9D:
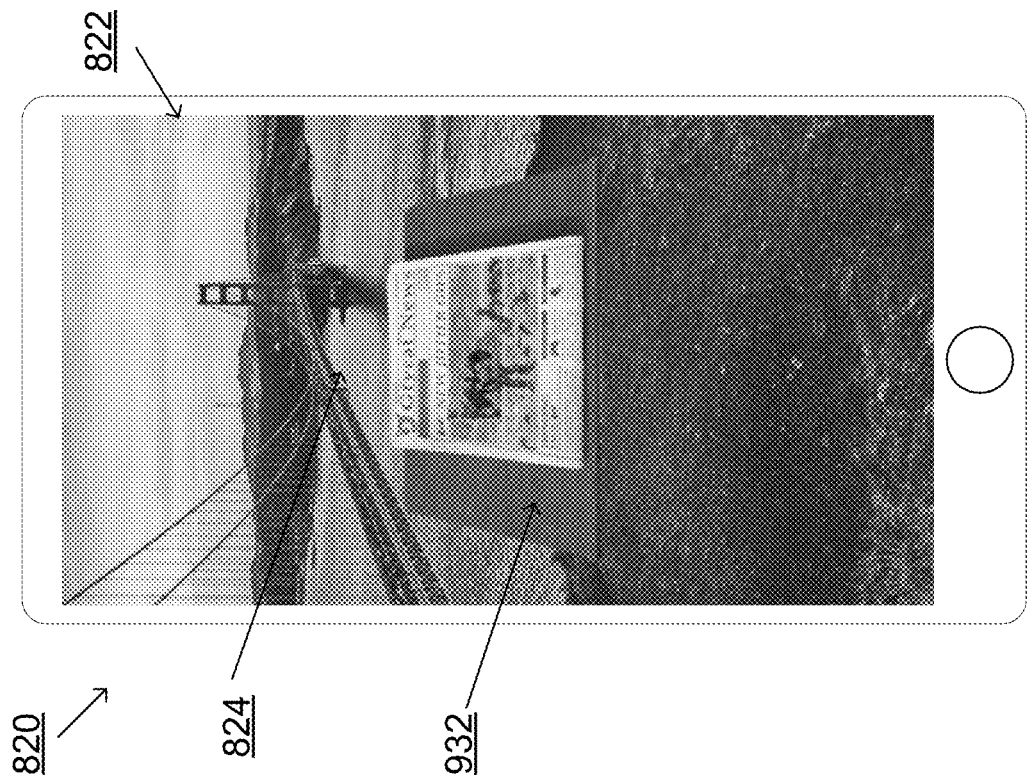
FIG. 9D illustrates another example modified prerecorded video file superimposed over a video, according to an embodiment.
Figure 9C:
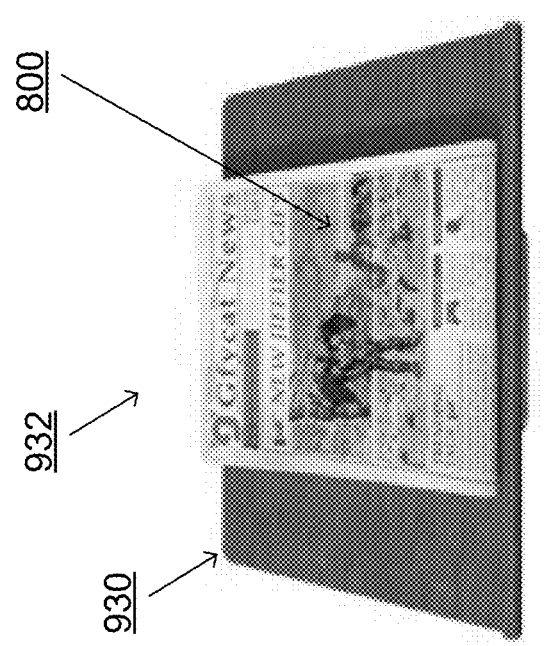
FIG. 9C illustrates an example of a modified prerecorded video file including a prerecorded video file superimposed onto a graphical object as a texture, according to an embodiment.

FIG. 9C illustrates an example of a modified prerecorded video file 932 including prerecorded video file 800 superimposed onto graphical object 930 as a texture, according to an embodiment. Modified prerecorded video file 932 is generated by superimposing prerecorded video file 800 onto a region of graphical object 930. As illustrated, graphical object 930 is a pedestal holding a newspaper, where prerecorded video file 800 is displayed within a region of the newspaper. Since the newspaper is resting at an angle relative to the viewer, meshes 910 and 920 are used to provide perspective to prerecorded video file 800, visually integrating prerecorded video file 800 into graphical object 930.

FIG. 9D illustrates another example view of mobile electronic device 820. As illustrated, display 822 is displaying video 824, where video 824 depicts a scene a live video captured by a video capture device (e.g., a rear-facing camera) of mobile electronic device 820. Mobile electronic device 820 also plays modified prerecorded video file 932 over video 824. Modified prerecorded video file 932, as illustrated, is placed in the scene such that it visually appears as if the graphical object of modified prerecorded video file 932 is sitting atop the bluff, visually integrating modified prerecorded video file 932 into the scene. It should be appreciated that the content of modified prerecorded video file 932 (e.g., prerecorded video file 800) may be selected as described above, in accordance with FIGS. 3A through 5C. Modified rerecorded video file 932 enhances the experience of the user of mobile electronic device 820 by integrating a prerecorded video file into a live scene. It should be appreciated that in some embodiments, modified prerecorded video file 932 is positioned within display 822 so as to not obscure important visual elements of video 824 (e.g., the name of a business location, the logo of a business location, etc.) Moreover, it should be appreciated that modified prerecorded video file 932 can maintains an orientation orthogonal to a camera angle of the video during the play of modified prerecorded video file 932.

In some embodiments, the modification selection includes a graphical modification of the prerecorded video file. In one embodiment, the visual appearance of the prerecorded video file is modified by applying the graphical modification to the prerecorded video file to generate the modified prerecorded video file. FIGS. 10A through 10H illustrate examples of different graphical modification that can be applied to a prerecorded video file to visually integrate the prerecorded video file into the video.

Figure 10B:
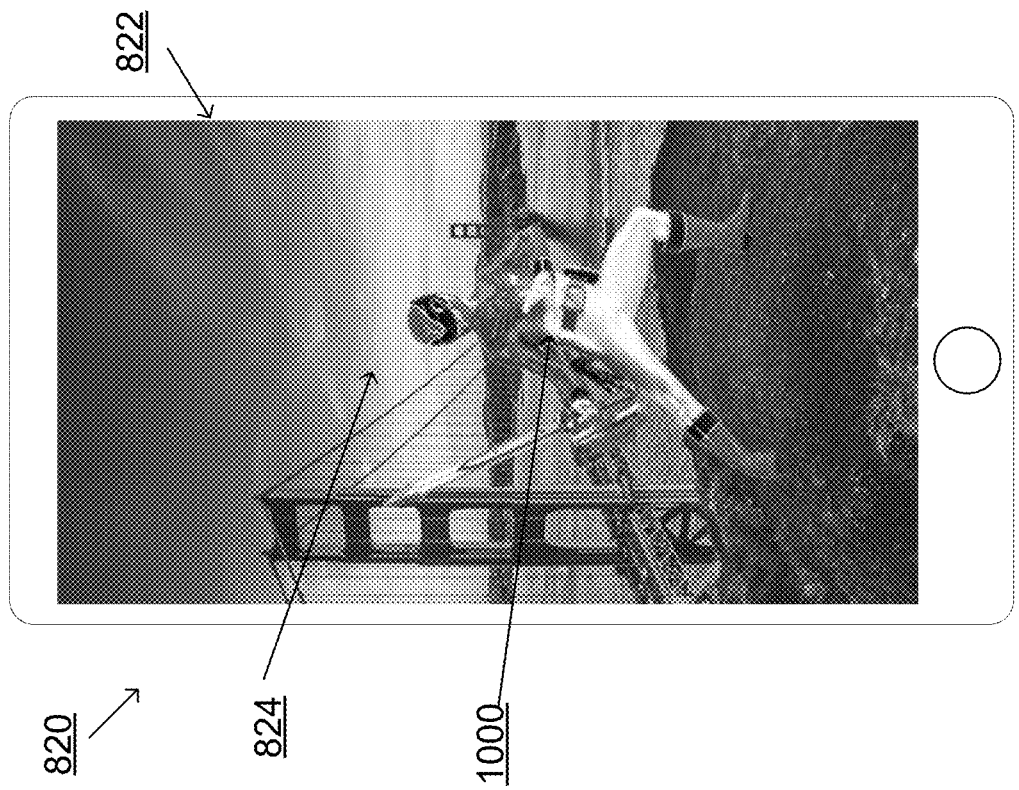
FIG. 10B illustrates the modified prerecorded video file of FIG. 10A superimposed over a video, according to an embodiment.
Figure 10A:
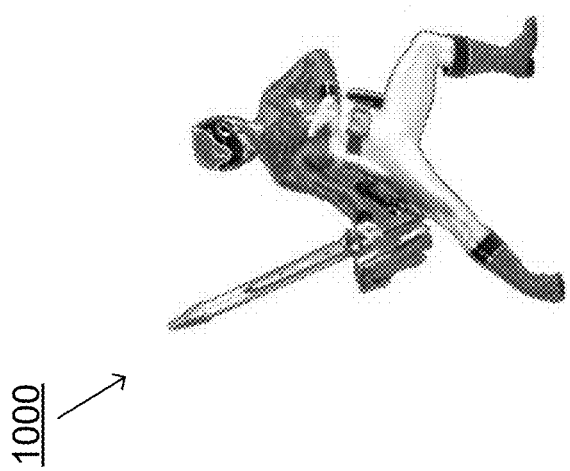
FIG. 10A illustrates an example modified prerecorded video file, in which the background has been removed, according to an embodiment.

FIG. 10A illustrates an example modified prerecorded video file 1000, in which the background has been removed, according to an embodiment. Modified prerecorded video file 1000 is generated by removing selected portions from prerecorded video file 800 of FIG. 8A. For example, a transparency filter may be applied to prerecorded video file 800 to visually remove portions from prerecorded video file 800 (e.g., portions other than the illustrated character). In another example, select portions (e.g., the illustrated character) are extracted from prerecorded video file 800.

FIG. 10B illustrates modified prerecorded video file 1000 of FIG. 10A superimposed over a video 824, according to an embodiment. FIG. 10B illustrates another example view of mobile electronic device 820. As illustrated, display 822 is displaying video 824, where video 824 depicts a scene a live video captured by a video capture device (e.g., a rear-facing camera) of mobile electronic device 820. Mobile electronic device 820 also plays modified prerecorded video file 1000 over video 824. Modified prerecorded video file 1000, as illustrated, is placed in the scene such that it visually appears as if the graphical object of modified prerecorded video file 1000 is standing atop the bluff, visually integrating modified prerecorded video file 1000 into the scene. It should be appreciated that the content of modified prerecorded video file 1000 (e.g., prerecorded video file 800) may be selected as described above, in accordance with FIGS. 3A through 5C. Modified rerecorded video file 1000 enhances the experience of the user of mobile electronic device 820 by integrating a prerecorded video file into a live scene. It should be appreciated that in some embodiments, modified prerecorded video file 1000 is positioned within display 822 so as to not obscure important visual elements of video 824 (e.g., the name of a business location, the logo of a business location, etc.) Moreover, it should be appreciated that modified prerecorded video file 1000 can maintains an orientation orthogonal to a camera angle of the video during the play of modified prerecorded video file 1000.

Figure 10D:
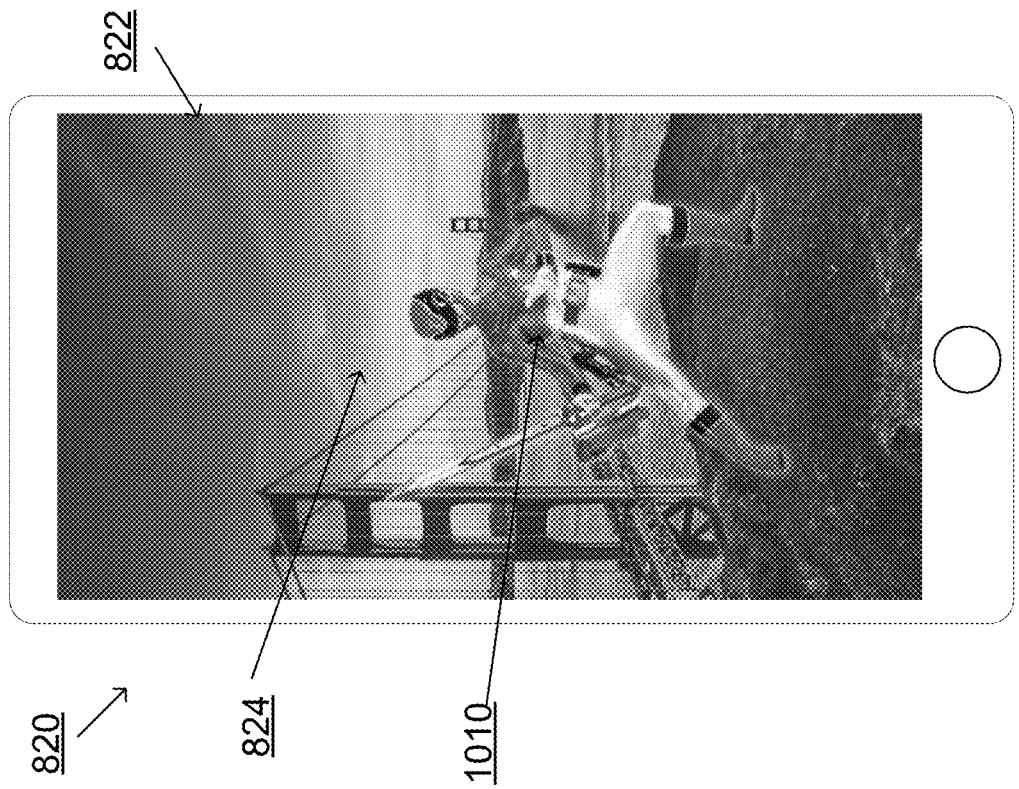
FIG. 10D illustrates the modified prerecorded video file of FIG. 10C superimposed over a video, according to an embodiment.
Figure 10C:
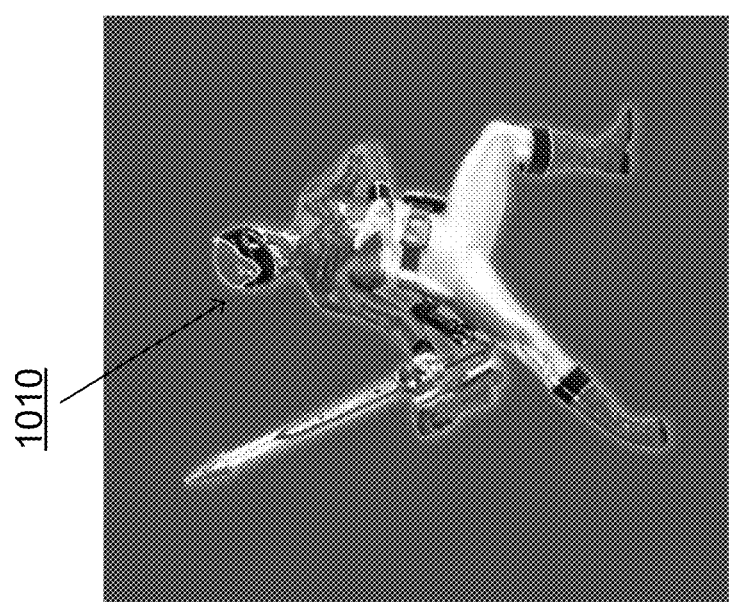
FIG. 10C illustrates an example modified prerecorded video file, in which the background has been removed and blurring has been applied, according to an embodiment.

FIG. 10C illustrates an example modified prerecorded video file 1010, in which the background has been removed and blurring has been applied, according to an embodiment. Modified prerecorded video file 1010 is generated by removing selected portions from prerecorded video file 800 and blurring edges of the non-removed portions of prerecorded video file 800. For example, blurring (e.g., feathering) is applied to modified prerecorded video file 1000 of FIG. 10A to generate modified prerecorded video file 1010.

FIG. 10D illustrates modified prerecorded video file 1010 of FIG. 10C superimposed over a video 824, according to an embodiment. FIG. 10D illustrates another example view of mobile electronic device 820. As illustrated, display 822 is displaying video 824, where video 824 depicts a scene a live video captured by a video capture device (e.g., a rear-facing camera) of mobile electronic device 820. Mobile electronic device 820 also plays modified prerecorded video file 1010 over video 824. Modified prerecorded video file 1010, as illustrated, is placed in the scene such that it visually appears as if the graphical object of modified prerecorded video file 1010 is standing atop the bluff, visually integrating modified prerecorded video file 1010 into the scene. It should be appreciated that the content of modified prerecorded video file 1010 (e.g., prerecorded video file 800) may be selected as described above, in accordance with FIGS. 3A through 5C. Modified rerecorded video file 1010 enhances the experience of the user of mobile electronic device 820 by integrating a prerecorded video file into a live scene. It should be appreciated that in some embodiments, modified prerecorded video file 1010 is positioned within display 822 so as to not obscure important visual elements of video 824 (e.g., the name of a business location, the logo of a business location, etc.) Moreover, it should be appreciated that modified prerecorded video file 1010 can maintains an orientation orthogonal to a camera angle of the video during the play of modified prerecorded video file 1010.

Figure 10F:
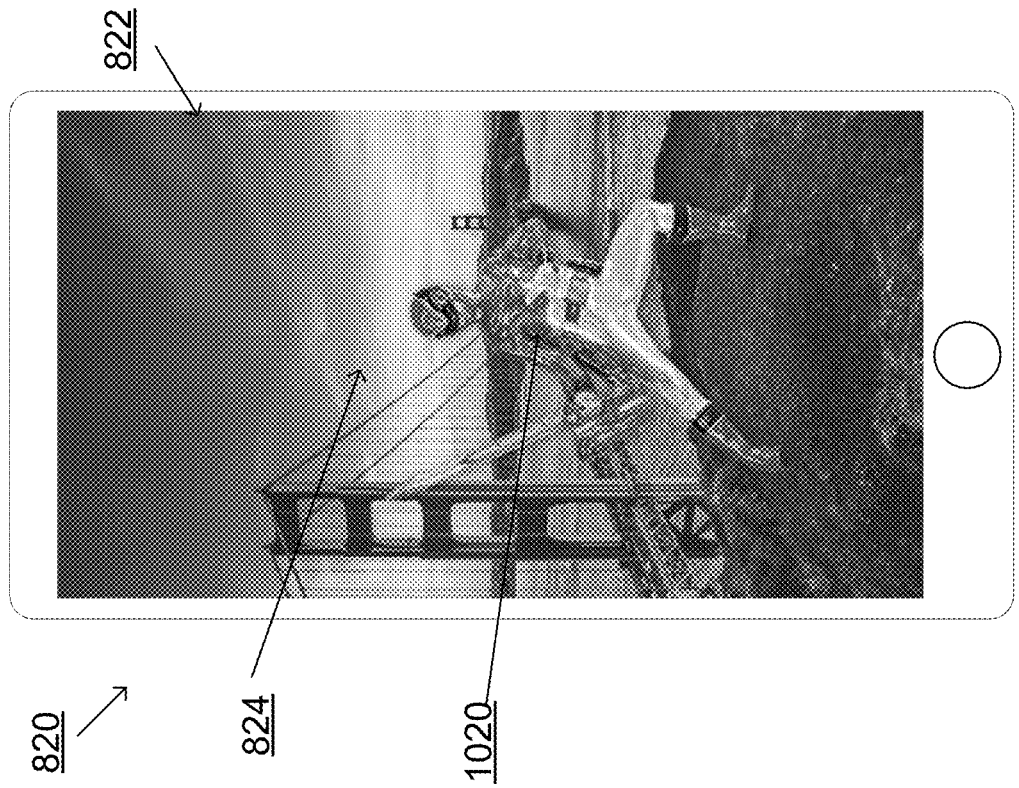
FIG. 10F illustrates the modified prerecorded video file of FIG. 10E superimposed over a video, according to an embodiment.
Figure 10E:
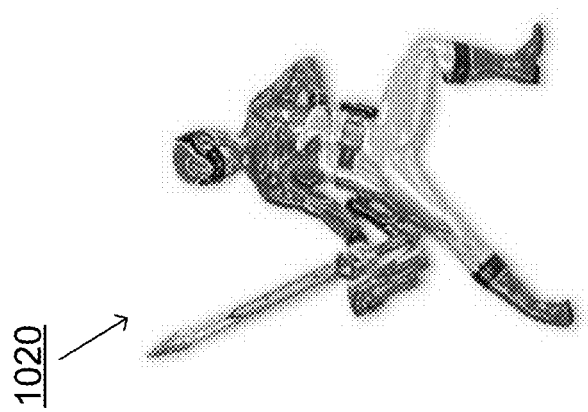
FIG. 10E illustrates an example modified prerecorded video file, in which the background has been removed and smoothing has been applied, according to an embodiment.

FIG. 10E illustrates an example modified prerecorded video file 1020, in which the background has been removed and smoothing has been applied, according to an embodiment. Modified prerecorded video file 1020 is generated by removing selected portions from prerecorded video file 800 and smoothing of the non-removed portions of prerecorded video file 800. For example, smoothing is applied to modified prerecorded video file 1000 of FIG. 10A to generate modified prerecorded video file 1020.

FIG. 10F illustrates modified prerecorded video file 1020 of FIG. 10E superimposed over a video 824, according to an embodiment. FIG. 10F illustrates another example view of mobile electronic device 820. As illustrated, display 822 is displaying video 824, where video 824 depicts a scene a live video captured by a video capture device (e.g., a rear-facing camera) of mobile electronic device 820. Mobile electronic device 820 also plays modified prerecorded video file 1020 over video 824. Modified prerecorded video file 1020, as illustrated, is placed in the scene such that it visually appears as if the graphical object of modified prerecorded video file 1020 is standing atop the bluff, visually integrating modified prerecorded video file 1020 into the scene. It should be appreciated that the content of modified prerecorded video file 1020 (e.g., prerecorded video file 800) may be selected as described above, in accordance with FIGS. 3A through 5C. Modified rerecorded video file 1020 enhances the experience of the user of mobile electronic device 820 by integrating a prerecorded video file into a live scene. It should be appreciated that in some embodiments, modified prerecorded video file 1020 is positioned within display 822 so as to not obscure important visual elements of video 824 (e.g., the name of a business location, the logo of a business location, etc.) Moreover, it should be appreciated that modified prerecorded video file 1020 can maintains an orientation orthogonal to a camera angle of the video during the play of modified prerecorded video file 1020.

Figure 10H:
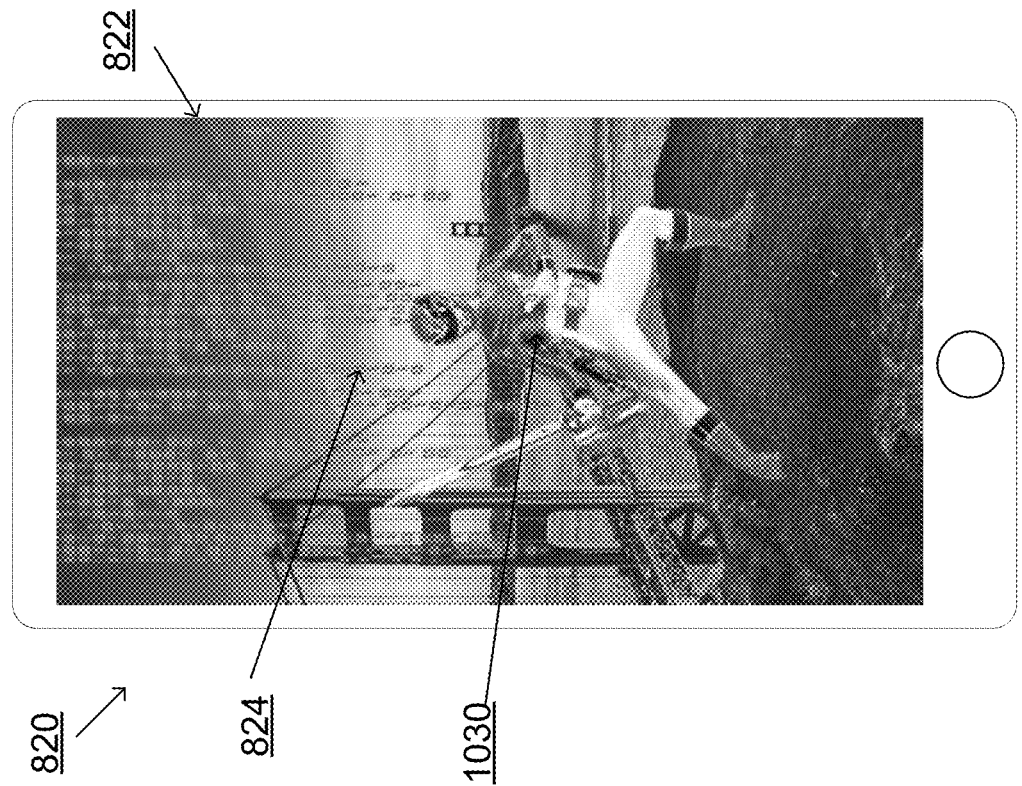
FIG. 10H illustrates the modified prerecorded video file of FIG. 10G superimposed over a video, according to an embodiment.
Figure 10G:
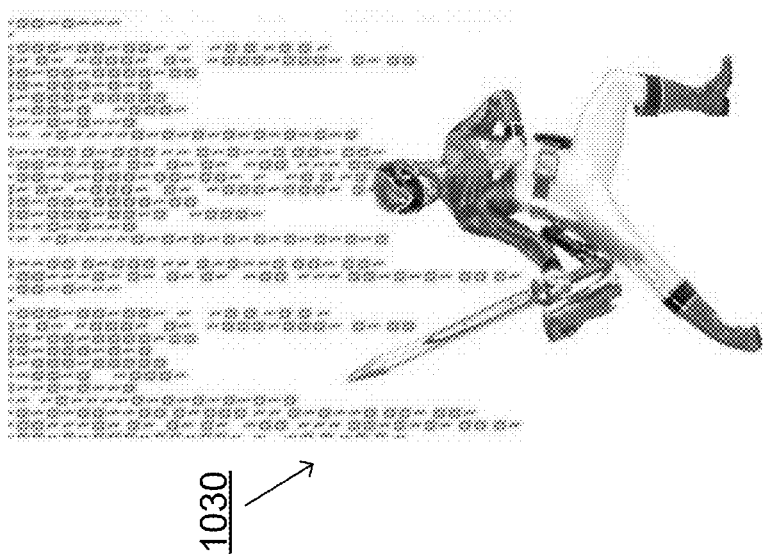
FIG. 10G illustrates an example modified prerecorded video file, in which the background has been removed and a filter has been applied, according to an embodiment.

FIG. 10G illustrates an example modified prerecorded video file 1020, in which the background has been removed and a filter has been applied, according to an embodiment. Modified prerecorded video file 1030 is generated by removing selected portions from prerecorded video file 800 and applying a filter to the non-removed portions of prerecorded video file 800. For example, a filter is applied to modified prerecorded video file 1000 of FIG. 10A to generate modified prerecorded video file 1030.

FIG. 10H illustrates modified prerecorded video file 1030 of FIG. 10G superimposed over a video 824, according to an embodiment. FIG. 10H illustrates another example view of mobile electronic device 820. As illustrated, display 822 is displaying video 824, where video 824 depicts a scene a live video captured by a video capture device (e.g., a rear-facing camera) of mobile electronic device 820. Mobile electronic device 820 also plays modified prerecorded video file 1030 over video 824. Modified prerecorded video file 1030, as illustrated, is placed in the scene such that it visually appears as if the graphical object of modified prerecorded video file 1030 is standing atop the bluff, visually integrating modified prerecorded video file 1030 into the scene. It should be appreciated that the content of modified prerecorded video file 1030 (e.g., prerecorded video file 800) may be selected as described above, in accordance with FIGS. 3A through 5C. Modified rerecorded video file 1030 enhances the experience of the user of mobile electronic device 820 by integrating a prerecorded video file into a live scene. It should be appreciated that in some embodiments, modified prerecorded video file 1030 is positioned within display 822 so as to not obscure important visual elements of video 824 (e.g., the name of a business location, the logo of a business location, etc.) Moreover, it should be appreciated that modified prerecorded video file 1030 can maintains an orientation orthogonal to a camera angle of the video during the play of modified prerecorded video file 1030.

Figure 11B:
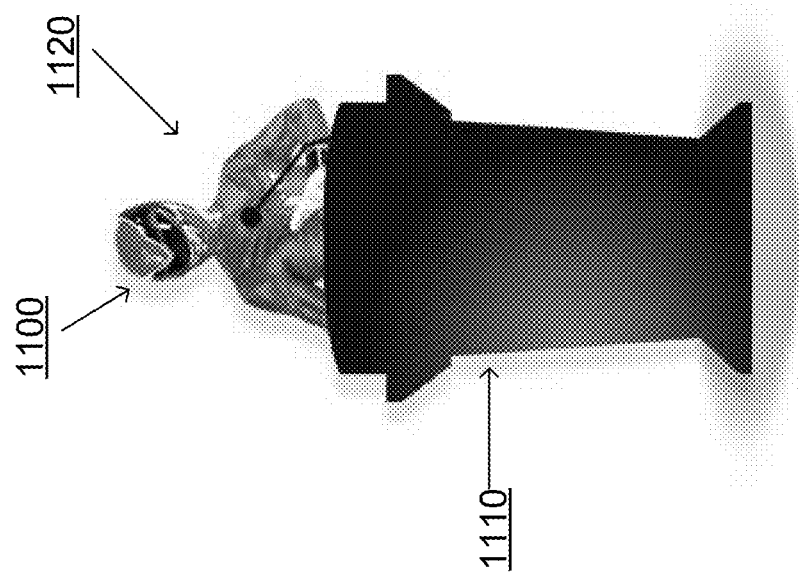
FIG. 11B illustrates an example modified prerecorded video file, in which a graphical object has been superimposed over the remaining portion of FIG. 11A, in accordance with an embodiment.
Figure 11A:
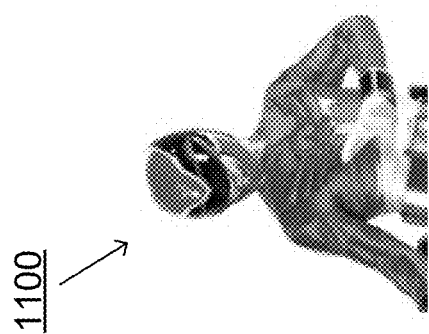
FIG. 11A illustrates an example modified prerecorded video file, in which the background and a lower portion has been removed, according to an embodiment.

FIG. 11A illustrates an example modified prerecorded video file 1100, in which the background and a lower portion has been removed, according to an embodiment. In one embodiment, modified prerecorded video file 1100 is generated by removing selected portions from prerecorded video file 800 of FIG. 8A. In another embodiment, modified prerecorded video file 1100 is generated by removing a lower portion from prerecorded video file 1000 of FIG. 10A.

FIG. 11B illustrates an example modified prerecorded video file 1120, in which graphical object 1110 has been superimposed over modified prerecorded video file 1100, in accordance with an embodiment. As illustrated, graphical object 1110 is a podium and modified prerecorded video file 1100 includes a person, such that it visually appears as if a person is moving behind a podium when modified prerecorded video file 1120 is played.

Figure 11C:
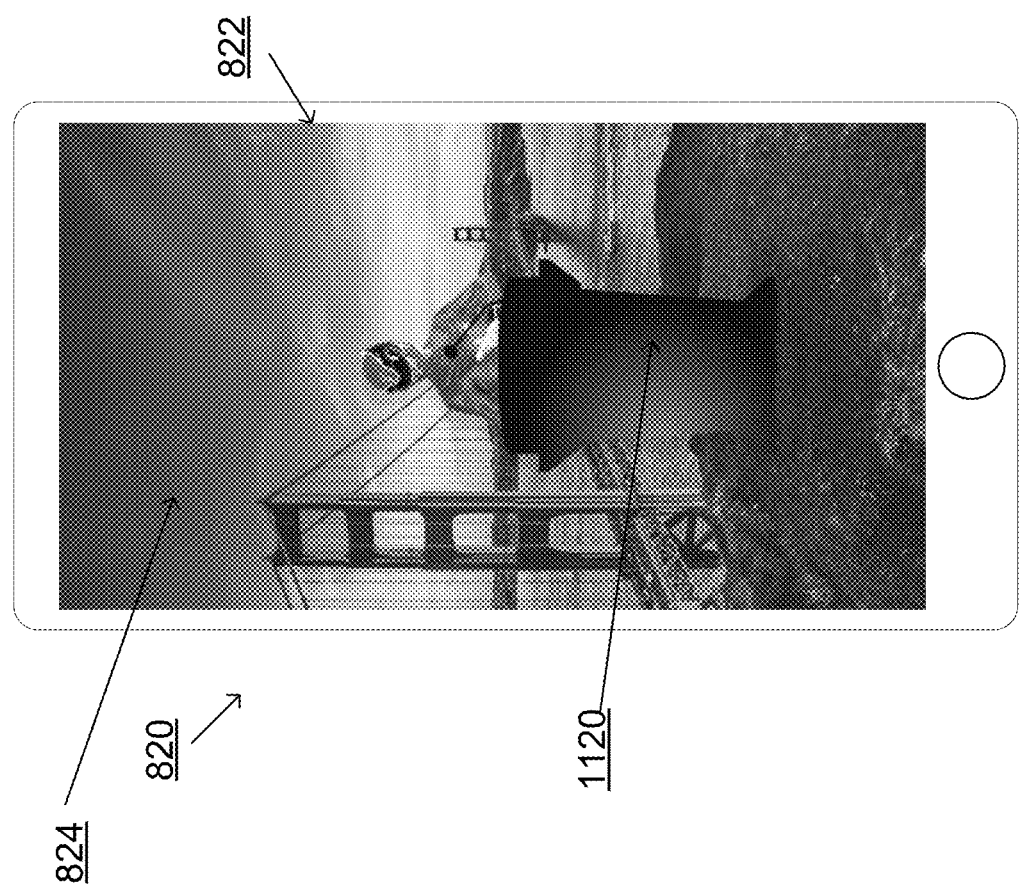
FIG. 11C illustrates the modified prerecorded video file of FIG. 11B superimposed over a video, according to an embodiment.

FIG. 11C illustrates the modified prerecorded video file 1120 of FIG. 11B superimposed over a video 824, according to an embodiment. FIG. 11C illustrates another example view of mobile electronic device 820. As illustrated, display 822 is displaying video 824, where video 824 depicts a scene a live video captured by a video capture device (e.g., a rear-facing camera) of mobile electronic device 820. Mobile electronic device 820 also plays modified prerecorded video file 1120 over video 824. Modified prerecorded video file 1120, as illustrated, is placed in the scene such that it visually appears as if the graphical object of modified prerecorded video file 1120 is standing atop the bluff, visually integrating modified prerecorded video file 1120 into the scene. It should be appreciated that the content of modified prerecorded video file 1120 (e.g., prerecorded video file 800) may be selected as described above, in accordance with FIGS. 3A through 5C. Modified rerecorded video file 1120 enhances the experience of the user of mobile electronic device 820 by integrating a prerecorded video file into a live scene. It should be appreciated that in some embodiments, modified prerecorded video file 1120 is positioned within display 822 so as to not obscure important visual elements of video 824 (e.g., the name of a business location, the logo of a business location, etc.) Moreover, it should be appreciated that modified prerecorded video file 1120 can maintains an orientation orthogonal to a camera angle of the video during the play of modified prerecorded video file 1120.

Figure 12:
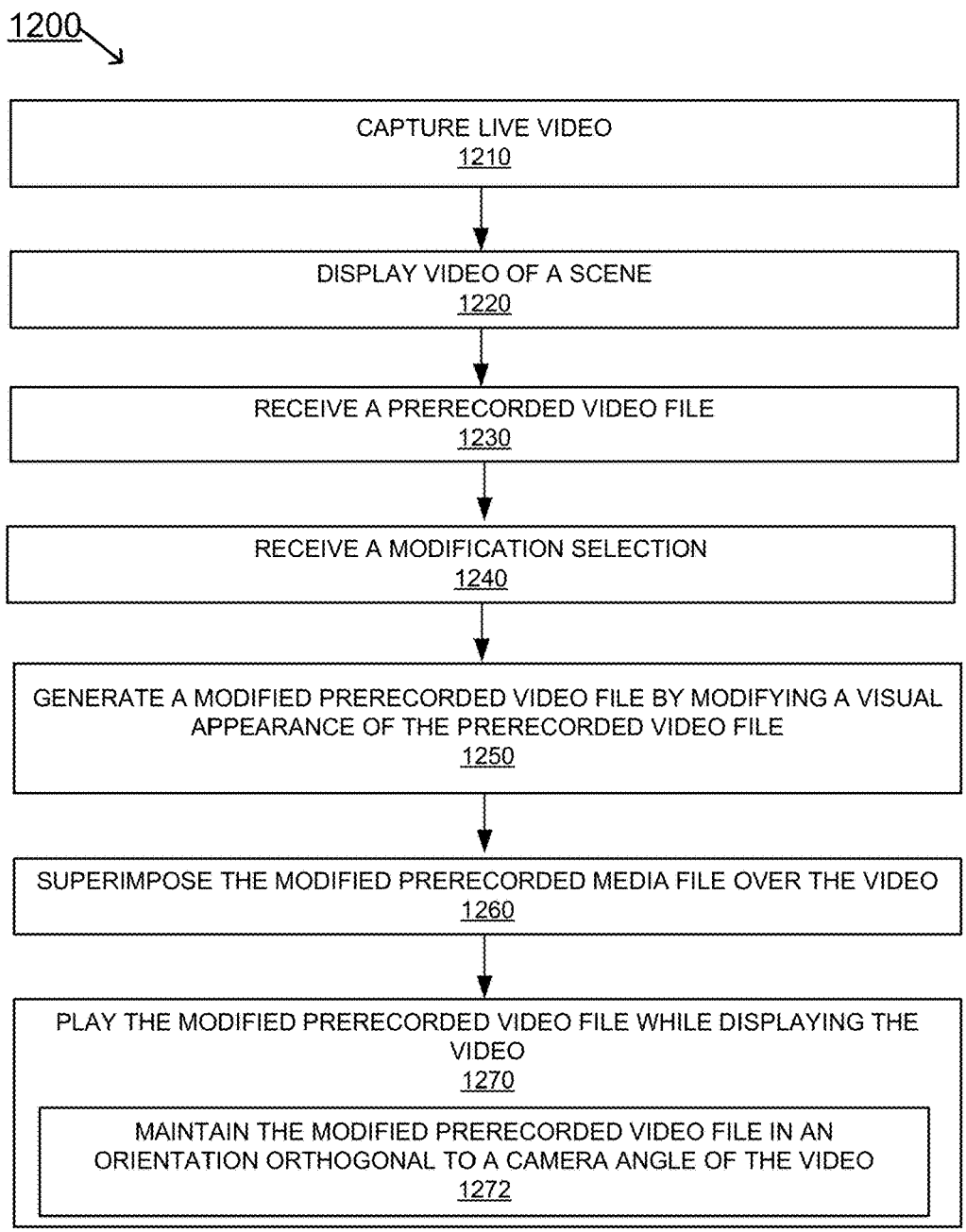
FIG. 12 illustrates a flow diagram of an example method for integrating a prerecorded media file into a video, according to various embodiments.

Example Methods of Operation of Integrating a Prerecorded Video File into a Video FIG. 12 illustrates a flow diagram 1200 of an example method for integrating a prerecorded media file into a video, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 1200 includes some procedures that, in various embodiments, are carried out by one or more processors under the control of computer-readable and computer-executable instructions that are stored on non-transitory computer-readable storage media. It is further appreciated that one or more procedures described in flow diagram 1200 may be implemented in hardware, or a combination of hardware with firmware and/or software.

In one embodiment, as shown at procedure 1210 of flow diagram 1200, live video is captured at a video capture device (e.g., optical sensor 135) of a mobile electronic device (e.g., mobile electronic device 100). At procedure 1220, a video of a scene is displayed on a display device (e.g., display 140) of the mobile electronic device. In one embodiment, the video is live video captured at procedure 1210.

At procedure 1230, a prerecorded video file to render on the display device is received. At procedure 1240, in one embodiment, a modification selection defining the modifying of the visual appearance of the prerecorded video file is received. In one embodiment, the modification selection includes a graphical object for placement into the video of the scene, wherein the graphical object is a three-dimensional model. In one embodiment, the modification selection includes a graphical modification of the prerecorded video file.

At procedure 1250, a modified prerecorded video file is generated by modifying a visual appearance of the prerecorded video file, wherein the modifying is for integrating the modified prerecorded video file into the scene. In accordance with various embodiments, procedure 1250 is performed according to FIGS. 13A through 13C. FIGS. 13A through 13C illustrate flow diagrams of example methods for generating a modified prerecorded video file, according to various embodiments.

With reference to FIG. 13A, in accordance with one embodiment, as shown at procedure 1310 of flow diagram 1300, the modified prerecorded video file is generated by superimposing the prerecorded video file onto a region of the graphical object.

With reference to FIG. 13B, in accordance with another embodiment, as shown at procedure 1330 of flow diagram 1300, a mesh that conforms to the region of the graphical object is received. At procedure 1340, the mesh is applied to the prerecorded video file. At procedure 1350, the modified prerecorded video file is generated by superimposing the prerecorded video file onto a region of the graphical object as a texture based on the mesh.

With reference to FIG. 13C, in accordance with one embodiment, as shown at procedure 1370 of flow diagram 1360, the modified prerecorded video file is generated by applying the graphical modification to the prerecorded video file. For example, the graphical modification can include at least one of, without limitation: blurring a portion of the prerecorded video file, smoothing a portion of the prerecorded video file, applying a filter to a portion of the prerecorded video file, removing a background of the prerecorded video file, and adding a graphical object to the prerecorded video file.

With reference to FIG. 12, at procedure 1260, the modified prerecorded video file is superimposed over the video, such that the video is partially obscured by the prerecorded video file. The prerecorded video file is played while displaying the video, such that the modified prerecorded video file and a non-obscured portion of the video are rendered simultaneously. In some embodiments, the modified prerecorded video file is selectable for interactivity, wherein a user interaction with the modified prerecorded video file initiates an action. (e.g., navigate to a particular website, show content, transform the prerecorded video file, etc.)

At procedure 1270, the modified prerecorded video file is played while displaying the video, such that the modified prerecorded video file and a non-obscured portion of the video are rendered simultaneously. In one embodiment, as shown in procedure 1272, the modified prerecorded video file is maintained in an orientation orthogonal to a camera angle of the video.

Example Network and System for Tracking Interactivity with Prerecorded Media Files Directing communications to interested or potentially interested parties is typically a challenging endeavor. Whether the initiating party is a business (e.g., for-profit or non-profit), a governmental agency, or a service provider, it is often difficult to effectively target a desired audience of a communication. For example, billboards and television advertisements, while subject to some focusing such as a high level makeup of the viewing population, are generally scattershot approaches to communicating. The advent of the Internet has improved communication targeting, but is still limited in the types of information that can be presented and when to present certain types of communications.

Embodiments described herein improve the targeting of communication to people such that a communication (e.g., an advertisement or notification) can be presented to people at an appropriate place and time to increase effectiveness of the communication while integrating the communication into a person's view of the world. Presenting communications to people in a contextual and palatable manner increases the effectiveness of the communication, reduces overuse and/or saturation of the communication, and improves the return on investment of the communicating party. In other words, presenting a communication to a person at a time and location, and in a contextual and engaging manner, increases the efficacy of the communication.

The described embodiments improve the technology of communicating information by integrating prerecorded media files into the real world while engaging with the real world. Performance of the computer system is improved by not unnecessarily presenting communications in a manner that is less effective, thereby not wasteful of processing and network bandwidth, power consumption of mobile devices, time of the viewing party, and financial resources of the presenting party.

In accordance with various embodiments, a prerecorded media file may be presented for display according to the instructions of a placing party (e.g., a business or an advertiser) within a live video of the real world in which the viewing party is located. For instance, a business may want to display a prerecorded video file on a display screen of a mobile electronic device when the mobile electronic device is geographically proximate a location of the business. For example, Starbucks may want to display a prerecorded video file when the mobile electronic device is near a Starbucks location. The placing party can provide presentation instructions that dictate conditions for displaying the prerecorded video file, expiration conditions that dictate how usage of a prerecorded video file is terminated, and/or user-based conditions that dictate conditions for displaying a prerecorded video file. Moreover, in accordance with various embodiments, instances of the display of a prerecorded video file and instances of interaction with a prerecorded video file can be logged for communicating to the placing party.

A mobile electronic device (e.g., mobile electronic device 100) displays video of a scene on a display device (e.g., display 140). In one embodiment, the video is live video of a scene captured by an optical sensor of the mobile electronic device (e.g., a rear-facing camera). In such an embodiment, the scene is viewable to a user of the mobile electronic device both on the display device of the mobile electronic device and without using the display device. As the user moves through the world, the mobile electronic device can display prerecorded video files superimposed into the scene viewable through the display device. The prerecorded video files are integrated into the live scene of the real world, enhancing the viewing experience of the user.

Figure 14:
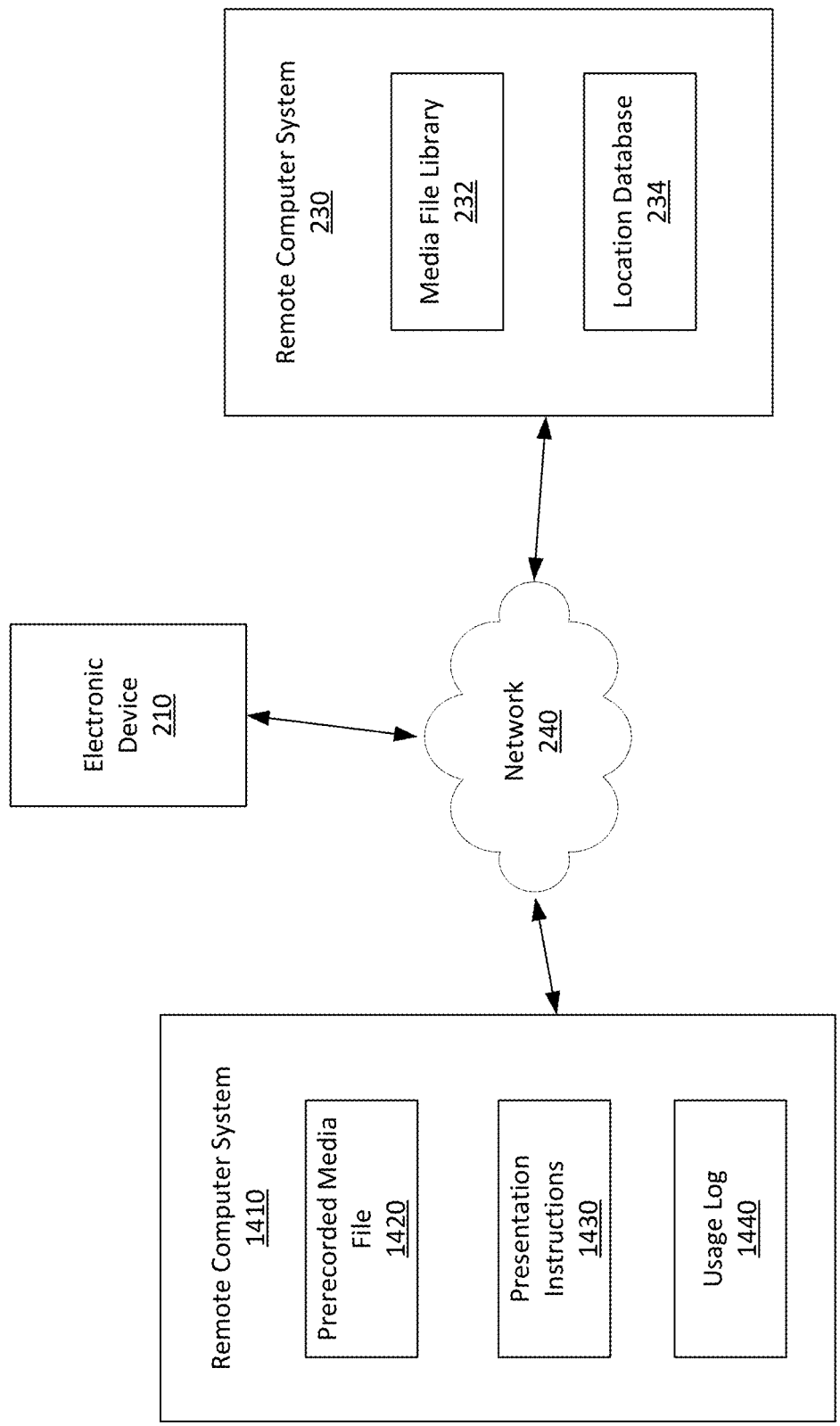
FIG. 14 illustrates an example network upon which other embodiments described herein may be implemented.

In some embodiments, prerecorded media files are displayed on a mobile electronic device, superimposed on a live video, according to presentation instructions. FIG. 14 illustrates another embodiment of example communication network 240 upon which embodiments described herein may be implemented. FIG. 14 illustrates electronic device 210, remote computer system 230, and remote computer system 1410, which are communicatively coupled via network 240. It should be appreciated that electronic device 210 may be implemented as a mobile electronic device 100, and/or include any combination of the components of mobile electronic device 100.

Electronic device 210 is capable of displaying video of a scene (e.g., e.g., scene 250 at display 140). In one embodiment, the scene is captured at a video capture device (e.g., optical sensor 135-1) of electronic device 210. Electronic device 210 may be associated with a particular user. Embodiments of the operation remote computer system 230 and electronic device 210 are described above with reference to FIG. 2.

Remote computer system 1410 includes prerecorded media file 1420 and presentation instructions 1430. Prerecorded media file 1420 can be any type of file that can be rendered on an electronic device 210 (e.g., a prerecorded video file). It should be appreciated that any type of media file format can be used in accordance with the described embodiments, including but not limited to Graphics Interchange Format (GIF), WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat. It also should be appreciated that remote computer system 1410 can include any number of prerecorded media files 1420 and presentation instructions 1430.

Presentation instructions 1430 are associated with prerecorded media file 1420, and include display conditions for displaying prerecorded media file 1420 on electronic device 210. The display conditions are conditions dictating when and how prerecorded media file 1420 is displayed on electronic device 210. In one embodiment, the display conditions of presentation instructions 1430 include one or more geographic locations for displaying prerecorded media file 1420 on electronic device 210. For example, responsive to detecting that electronic device 210 is at a geographic location or proximate a geographic location (e.g., within a particular distance of a geographic location as defined in the display conditions), prerecorded media file 1420 is displayed on electronic device 210. In such an example, a user may be walking around town and viewing video of a live scene of their environment through an application operating on electronic device 210 (e.g., captured via a rear-facing camera). Responsive to detecting that electronic device 210 is at or proximate a particular business, prerecorded media file 1420 is displayed superimposed over the video of the live scene. In a particular example, the presentation instructions 1430 include display conditions to display prerecorded media file 1420 on electronic device 210 responsive to electronic device being at or proximate a McDonalds restaurant, where the content of the prerecorded media file 1420 is related to a McDonalds dining experience.

In other embodiments, the display conditions include identifying a location. In one embodiment, the location of the scene is determined using a location sensor (e.g., location sensor 170) of the mobile electronic device. In another embodiment, the location of the scene is determined using a third party application (e.g., Foursquare, Yelp). In another embodiment, symbol recognition is performed on the video to identify at least one symbol (e.g., logo, word, phrase, etc.) using location database 234.

In some embodiments, the display conditions of presentation instructions 1430 include temporal conditions. For example, a display condition may include a condition that prerecorded media file 1420 is only available for display during particular hours of the day. In one example, the display conditions may dictate that prerecorded media file is only available for display during business hours of the associated business.

In some embodiments, the display conditions of presentation instructions 1430 include geo-temporal conditions. Geo-temporal conditions are a combination of location conditions and temporal conditions. For example, a geo-temporal conditions may dictate that a prerecorded media file 1420 is displayed in response to detecting that electronic device 210 is at or proximate a particular location at a particular time or within a particular temporal range (e.g., 8:00 AM through 10:00 PM). In one example, remote computer system 1410 may include multiple prerecorded media files 1420 for a business, such that a first prerecorded media file is available for display during business hours and a second prerecorded media file is available for display during hours where the business is closed.

In some embodiments, presentation instructions 1430 include expiration conditions for terminating usage of prerecorded media file 1420 at electronic device 210. In order to increase effectiveness of prerecorded media file 1420, the party responsible for placing prerecorded media file 1420 according to presentation instructions 1430 may desire to control the number of times that prerecorded media file 1420 is displayed at a particular electronic device 210 and/or to a particular user. In one embodiment, the expiration condition is a number of times prerecorded media file 1420 is displayed (e.g., one time, two times, etc.) In another embodiment, the expiration condition is a frequency at which prerecorded media file 1420 can be displayed (e.g., no more than once per every four hours, no more than once per day, etc.) In another embodiment, the expiration condition is a date and/or time (e.g., expires on December 31, expires at 1:00 PM, etc.) In another embodiment, the expiration condition is a number of user interactions with prerecorded media file 1420 (e.g., one interaction, two interactions, etc.) In another embodiment, prerecorded media file 1420 expires upon detecting that electronic device 210 is no longer at or proximate a location. It should be appreciated that other expiration conditions may be used. The use of expiration conditions allows for the party placing prerecorded media file 1420 to granularly control presentation of prerecorded media file 1420, limiting overuse to reduce user exhaustion, as well as reducing processing usage, bandwidth usage, and power consumption of electronic device 210.

In some embodiments, presentation instructions 1430 include user-based conditions for displaying prerecorded media file 1420. The user-based conditions may be based on a user profile for a user operating electronic device 210, where the user profile may include explicit information provided by the user (e.g., age, gender, interests, etc.), implicit information gleaned from the user's actions (e.g., internet browsing history, frequented locations, etc.), or any combination thereof. Moreover, the user profile may be received from a third-party (e.g., Facebook, Instagram, etc.) In order to increase effectiveness of prerecorded media file 1420, the party responsible for placing prerecorded media file 1420 according to presentation instructions 1430 may target particular users based on particular user-based conditions. For example, the placing party may want prerecorded media file 1420 users of a particular gender and/or age range to see a particular prerecorded media file 1420. In one example, a business may be a clothing store for woman in their twenties and thirties. Presentation instructions 1430 could include user-based conditions to only display this prerecorded media file 1420 to female users with ages twenty through thirty-nine. The use of user-based conditions further allows for the party placing prerecorded media file 1420 to granularly control presentation of prerecorded media file 1420, limiting overuse to reduce user exhaustion, as well as reducing processing usage, bandwidth usage, and power consumption of electronic device 210.

In order to evaluate effectiveness of a particular prerecorded media file 1420, in some embodiments, electronic device 210 maintains usage log 1440. Responsive to a prerecorded media file 1420 being displayed on electronic device 210, the display instance is logged to usage log 1440. The placing party can access usage log 1440 for a particular prerecorded media file 1420, and use this information to assist in evaluating effectiveness of the prerecorded media file 1420.

In some embodiments, the prerecorded media file 1420 is selectable for interactivity. For example, a user may interact with prerecorded media file 1420 (e.g., touching it via a touch screen) while it is displayed on electronic device 210 to execute an action. For example, a user interaction with prerecorded media file 1420 may open up an Internet browser application and navigate to a particular website. In other examples, a user interaction with prerecorded media file 1420 may show content (e.g., a coupon or product information). In some embodiments, prerecorded media file 1420 may be transformed as a result of a user interaction (e.g., the prerecorded video file can be resized or moved within a display).

In order to further evaluate effectiveness of a particular prerecorded media file 1420, in some embodiments, interaction instances with prerecorded media file 1420 can also be logged to usage log 1440. Responsive to an interaction with (e.g., selection of) a prerecorded media file 1420 being displayed on electronic device 210, the interaction instance is logged to usage log 1440. The placing party can access usage log 1440 including interaction instances for a particular prerecorded media file 1420, and use this information to assist in evaluating effectiveness of the prerecorded media file 1420.

For example, as a user moves through the world, electronic device 210 detects satisfaction of display conditions (e.g., geo-temporal) and/or user-based conditions of presentation instructions 1430 and displays a particular prerecorded media file 1420 associated with a location, where the location is a Gap clothing store. The user, having been targeted by a party placing prerecorded media file 1420, is presented with prerecorded media file 1420 that shows a looping short form video of a Gap advertisement. The user can then interact (e.g., select) prerecorded media file 1420 while it is being displayed, and is presented with a coupon for use at the nearby Gap clothing store location. The display of prerecorded media file 1420 and the user interaction with prerecorded media file 1420 are logged as a display instance and interaction instance in usage log 1440.

Figure 15:
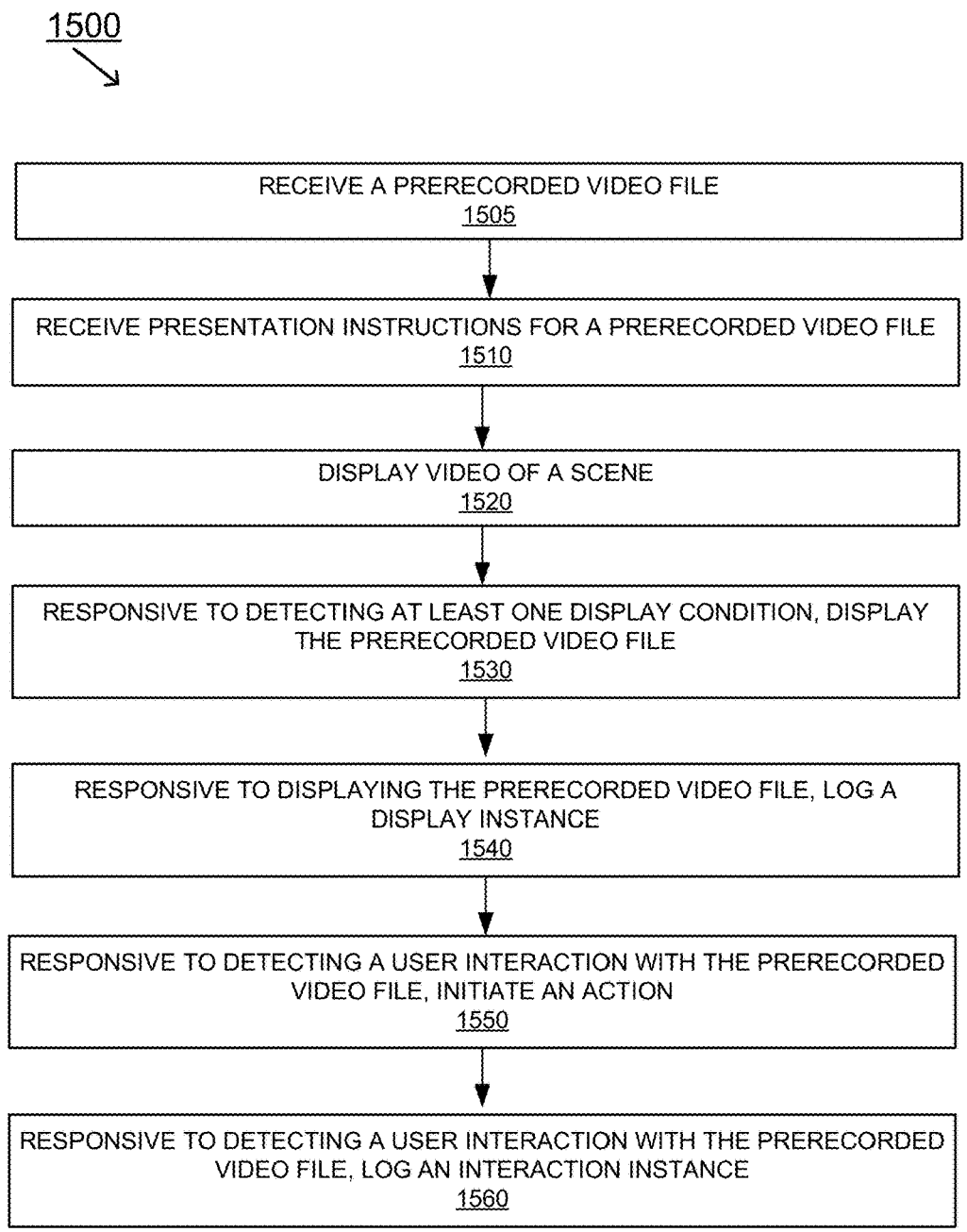
FIG. 15 illustrates a flow diagram of an example method for tracking interactivity with a prerecorded media file, according to various embodiments.

FIG. 15 illustrates a flow diagram 1500 of an example method for tracking interactivity with a prerecorded media file, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 1500 includes some procedures that, in various embodiments, are carried out by one or more processors under the control of computer-readable and computer-executable instructions that are stored on non-transitory computer-readable storage media. It is further appreciated that one or more procedures described in flow diagram 1500 may be implemented in hardware, or a combination of hardware with firmware and/or software.

In one embodiment, as shown at procedure 1505 of flow diagram 1500, a prerecorded video file to render on the display device is received. In one embodiment, the prerecorded video file is a looping video file. In one embodiment, the prerecorded video file is selectable for interactivity, wherein a user interaction with the displayed prerecorded video file initiates an action. In accordance with various embodiments, the action includes, without limitation, opening a web browser to display a web page, displaying a coupon, or opening an application.

At procedure 1510, presentation instructions for displaying the prerecorded video file on a display device (e.g., display 140) of a mobile electronic device (e.g., mobile electronic device 100) are received, where the presentation instructions include display conditions for displaying the prerecorded video file. In one embodiment, the display conditions include detection of a geographic location of the mobile electronic device. In one embodiment, the display conditions include one of temporal conditions, geographic conditions, and geo-temporal conditions. In one embodiment, the presentation instructions further include expiration conditions for terminating usage of the prerecorded video file at the mobile electronic device. In one embodiment, the expiration conditions include one of: a number of times the prerecorded video file is displayed, a time period after an initial display of the prerecorded video file, and a number of user interactions with the prerecorded video file. In one embodiment, the presentation instructions further comprise user-based conditions for displaying the prerecorded video file.

At procedure 1520, a video of a scene is displayed on the display device of the mobile electronic device. In one embodiment, the video is live video captured at a video capture device (e.g., optical sensor 135) of the mobile electronic device.

At procedure 1530, responsive to detecting at least one display condition of the display conditions, the prerecorded video file is displayed on the display device of the mobile electronic device such that the video is partially obscured by the prerecorded video file. At procedure 1540, responsive to the displaying the prerecorded video file, a display instance for the prerecorded video file is logged.

In one embodiment, as shown at procedure 1550, responsive to detecting a user interaction with the displayed prerecorded video file, the action is initiated. In one embodiment, as shown at procedure 1560, responsive to detecting a user interaction with the displayed prerecorded video file, an interaction instance for the prerecorded video file is logged.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A mobile electronic device comprising:
   a camera;
   a display device;
   a data storage unit; and
   a processor coupled with the data storage unit and the display device, the processor configured to:
      display a live video of a scene on a display device of a mobile electronic device, wherein the live video is captured at the camera of the mobile electronic device;
      receive a prerecorded video file to render on the display device;
      receive a modification selection defining a modification of a visual appearance of the prerecorded video file, wherein the modification selection comprises a graphical modification of the prerecorded video file to visually integrate the prerecorded video file into the scene;
      generate a modified prerecorded video file by modifying the visual appearance of the prerecorded video file according to the modification selection, wherein the modifying is for visually integrating the modified prerecorded video file into the scene;
      superimpose the modified prerecorded video file over the live video, such that the live video is partially obscured by the modified prerecorded video file, wherein the modified prerecorded video file is positioned relative to an object within the live video; and
      play the modified prerecorded video file while displaying the live video, such that the modified prerecorded video file and a non-obscured portion of the live video are rendered simultaneously.

2. The mobile electronic device of claim 1, wherein the modification selection comprises a graphical object for placement into the live video of the scene, wherein the graphical object is a three-dimensional model.

3. The mobile electronic device of claim 2, wherein the processor is further configured to:
   superimpose the prerecorded video file onto a region of the graphical object to generate the modified prerecorded video file.

4. The mobile electronic device of claim 3, wherein the processor is further configured to:
   receive a mesh that conforms to the region of the graphical object;
   apply the mesh to the prerecorded video file; and
   superimpose the prerecorded video file onto the region of the graphical object as a texture based on the mesh.

5. The mobile electronic device of claim 2, wherein the processor is further configured to:
   maintain the modified prerecorded video file in an orientation orthogonal to a camera angle of the live video during the play of the modified prerecorded video file.

6. The mobile electronic device of claim 1, wherein the processor is further configured to:
   apply the graphical modification to the prerecorded video file to generate the modified prerecorded video file.

7. The mobile electronic device of claim 6, wherein the graphical modification comprises at least one of:
   blurring a portion of the prerecorded video file;
   smoothing a portion of the prerecorded video file;
   applying a filter to a portion of the prerecorded video file;
   removing a background of the prerecorded video file;
   color matching an outer portion of the prerecorded video file to the live video; and
   adding a graphical object to the prerecorded video file.

8. A method for integrating a prerecorded video file into a video, the method comprising:
   displaying a live video of a scene on a display device of a mobile electronic device, wherein the live video is captured at a camera of the mobile electronic device;
   receiving a prerecorded video file to render on the display device;
   receiving a modification selection defining a modification of a visual appearance of the prerecorded video file, wherein the modification selection comprises a graphical object for placement into the live video of the scene, wherein the graphical object is a three-dimensional model;
   generating a modified prerecorded video file by modifying the visual appearance of the prerecorded video file, wherein the modifying is for integrating the modified prerecorded video file into the scene, the generating the modified prerecorded video file by modifying the visual appearance of the prerecorded video file comprising superimposing the prerecorded video file onto a region of the graphical object to generate the modified prerecorded video file;
   superimposing the modified prerecorded video file over the live video, such that the live video is partially obscured by the modified prerecorded video file; and
   playing the modified prerecorded video file while displaying the live video, such that the modified prerecorded video file and a non-obscured portion of the live video are rendered simultaneously.

9. The method of claim 8, wherein the generating the modified prerecorded video file by modifying the visual appearance of the prerecorded video file further comprises:
   receiving a mesh that conforms to the region of the graphical object;
   applying the mesh to the prerecorded video file; and
   superimposing the prerecorded video file onto the region of the graphical object as a texture based on the mesh.

10. The method of claim 8, wherein the playing the modified prerecorded video file while displaying the live video comprises:
    maintaining the modified prerecorded video file in an orientation orthogonal to a camera angle of the live video.

11. The method of claim 8, wherein the modification selection comprises a graphical modification of the prerecorded video file.

12. The method of claim 11, wherein the generating the modified prerecorded video file by modifying the visual appearance of the prerecorded video file comprises:
    applying the graphical modification to the prerecorded video file to generate the modified prerecorded video file.

13. The method of claim 11, wherein the graphical modification comprises at least one of:
    blurring a portion of the prerecorded video file;
    smoothing a portion of the prerecorded video file;

applying a filter to a portion of the prerecorded video file;
removing a background of the prerecorded video file; and
color matching an outer portion of the prerecorded video file to the live video.

14. A non-transitory computer readable storage medium having computer readable program code stored thereon for causing a computer system to perform a method for integrating a prerecorded video file into a video, the method comprising:
displaying a live video of a scene on a display device of a mobile electronic device, wherein the live video is captured at a camera of the mobile electronic device;
receiving a prerecorded video file to render on the display device;
receiving a modification selection defining a modification of a visual appearance of the prerecorded video file;
generating a modified prerecorded video file by modifying the visual appearance of the prerecorded video file based on the modification selection, wherein the modifying is for integrating the modified prerecorded video file into the scene;
superimposing the modified prerecorded video file over the live video, such that the live video is partially obscured by the modified prerecorded video file; and
playing the modified prerecorded video file while displaying the live video, such that the modified prerecorded video file and a non-obscured portion of the live video are rendered simultaneously, wherein the modified prerecorded video file is maintained in an orientation orthogonal to a camera angle of the live video during the playing of the modified prerecorded video file.

15. The non-transitory computer readable storage medium of claim 14, wherein the modification selection comprises a graphical object for placement into the live video of the scene, wherein the generating the modified prerecorded video file by modifying a visual appearance of the prerecorded video file comprises:
superimposing the prerecorded video file onto a region of the graphical object to generate the modified prerecorded video file.

16. The non-transitory computer readable storage medium of claim 14, wherein the modification selection comprises a graphical modification of the prerecorded video file, wherein the generating the modified prerecorded video file by modifying a visual appearance of the prerecorded video file comprises:
applying the graphical modification to the prerecorded video file to generate the modified prerecorded video file.

* * * * *